United States Patent
Chen et al.

(10) Patent No.: US 10,194,304 B2
(45) Date of Patent: Jan. 29, 2019

(54) METHODS FOR RECEIVING DEVICE DISCOVERY INFORMATION AND SENDING DEVICE DISCOVERY INFORMATION AND USER EQUIPMENT

(71) Applicant: ZTE Corporation, Shenzhen (CN)

(72) Inventors: Lin Chen, Shenzhen (CN); Ying Huang, Shenzhen (CN); Yulan Liu, Shenzhen (CN); Yumin Luo, Shenzhen (CN); Shuyu Ma, Shenzhen (CN); Feng Xie, Shenzhen (CN); Zhaohua Lu, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 433 days.

(21) Appl. No.: 14/781,361

(22) PCT Filed: Jan. 24, 2014

(86) PCT No.: PCT/CN2014/071334
§ 371 (c)(1),
(2) Date: Jan. 5, 2016

(87) PCT Pub. No.: WO2014/161383
PCT Pub. Date: Oct. 9, 2014

(65) Prior Publication Data
US 2016/0150390 A1    May 26, 2016

(30) Foreign Application Priority Data

Apr. 1, 2013  (CN) .......................... 2013 1 0111450

(51) Int. Cl.
*H04W 8/00* (2009.01)
*H04W 8/24* (2009.01)
(Continued)

(52) U.S. Cl.
CPC ............. *H04W 8/005* (2013.01); *H04W 8/24* (2013.01); *H04W 40/246* (2013.01);
(Continued)

(58) Field of Classification Search
CPC .......... H04W 4/001–4/22; H04W 8/22–8/245; H04W 36/0055–36/0094;
(Continued)

(56) References Cited

U.S. PATENT DOCUMENTS

2014/0112194 A1* 4/2014 Novlan .................. H04W 8/005
370/254
2015/0195828 A1* 7/2015 Fujishiro ............. H04W 72/048
370/329
2016/0014589 A1* 1/2016 Niu ................... H04W 72/0413
370/329

FOREIGN PATENT DOCUMENTS

CN        101771586 A        7/2010
CN        102547984 A        7/2012
(Continued)

OTHER PUBLICATIONS

International Search Report for corresponding application PCT/CN2014/071334 filed Jan. 24, 2014; dated Apr. 3, 2014.
(Continued)

*Primary Examiner* — Timothy J Weidner
(74) *Attorney, Agent, or Firm* — Cantor Colburn LLP

(57) ABSTRACT

Disclosed are methods for receiving device discovery information and sending device discovery information, and UE. The method for receiving the device discovery information includes that: first UE receives device discovery information sent by second UE, wherein the device discovery information contains at least one piece of the following information: UE identification information and attribute information of the UE; and the first UE performs D2D discovery and/or D2D communication under the condition that the device
(Continued)

discovery information is consistent with a preset condition. By the disclosure, the technical problem of difficulty in meeting a requirement on D2D communication diversity caused by containing of only an ID in the device discovery information in the related technology is effectively solved, and the technical effect of improving D2D communication effectiveness and flexibility is achieved.

24 Claims, 5 Drawing Sheets

(51) Int. Cl.
      *H04W 40/24*       (2009.01)
      *H04W 48/16*       (2009.01)
      *H04W 52/02*       (2009.01)
      *H04W 68/00*       (2009.01)
      *H04W 88/04*       (2009.01)
      *H04W 92/18*       (2009.01)

(52) U.S. Cl.
      CPC ........ *H04W 48/16* (2013.01); *H04W 52/0212* (2013.01); *H04W 68/00* (2013.01); *H04W 88/04* (2013.01); *H04W 92/18* (2013.01); *Y02D 70/00* (2018.01); *Y02D 70/21* (2018.01)

(58) Field of Classification Search
      CPC ...... H04W 40/24–40/38; H04W 48/16–48/20; H04W 68/005–68/12; H04W 72/0406; H04W 74/002–74/02; H04W 76/002–76/068; H04W 84/005; H04W 84/18–84/22; H04W 88/04–88/12; H04W 92/18; H04W 92/22; H04L 67/104–67/1093

See application file for complete search history.

(56) References Cited

FOREIGN PATENT DOCUMENTS

| | | |
|---|---|---|
| CN | 102625252 A | 8/2012 |
| WO | 2011130630 A1 | 10/2011 |

OTHER PUBLICATIONS

Catt, "On D2D Discovery", 3PP Draft, 3rd Generation Partnership Project (3GPP), Mobile Competence Centre, vol. RAN WG1, No. 20130520-2010524, May 11, 2013, Internet URL: http://www.3gpp.org, XP050697682.

European Search Report for corresponding application 14 77 9381; Report dated Mar. 3, 2016.

Nokia, "D2D Discovery Signal Considerations", 3GPP Draft: R1-133498, 3rd Generation Partnership Project (3GPP), vol. RAN WG1, No. 20130819-20130823, Aug. 10, 2013, Internet URL: http://www.gpp.org/ftp/tsg_ran/WG1_RL1/TSGR1_74/Docs/, XP050716605.

Samsung, "D2D Direct Discovery-RAN2 Asp", 3GPP Draft, 3GPP, vol. RAN WG2, No. 20130819-20130823, Aug. 19-23, 2013, Internet URL http://www.3gpp.org, XP050718217.

\* cited by examiner

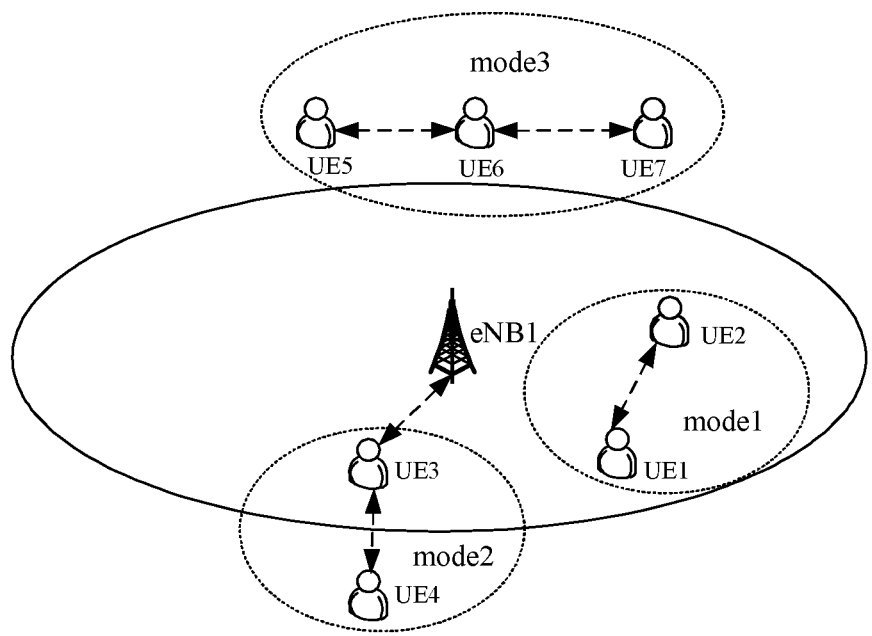

FIG. 1

```
first UE receives device discovery information sent by second UE,
wherein the device discovery information contains at least one
piece of the following information: UE identification information     S202
and attribute information of the UE the first UE executes D2D discovery and/or D2D communication
under the condition that the device discovery information is          S204
consistent with a preset condition
```

FIG. 2

METHODS FOR RECEIVING DEVICE DISCOVERY INFORMATION AND SENDING DEVICE DISCOVERY INFORMATION AND USER EQUIPMENT

TECHNICAL FIELD

The disclosure relates to the field of communication, and in particular to a method for receiving device discovery information, a method for sending device discovery information, and User Equipment (UE).

BACKGROUND

Along with the development of a wireless multimedia service, people have increasing requirements on high data rate and user experiences, so that higher requirements on system capacity and coverage of a conventional cellular network are made. On the other aspect, due to wide application of applications such as a social network, short-distance data sharing and local advertisement, requirements of people on proximity services gradually increase. A conventional base-station-centred cellular network has obvious limitations to high data rate and proximity service supporting, and under such a requirement background, a Device-to-Device (D2D) technology representative of a new development direction of a communication technology in the future emerges. With the application of the D2D technology, a burden of a cellular network may be reduced, battery power consumption of UE may be reduced, a data rate may be increased, robustness of a network infrastructure may be improved, and requirements of high-data-rate services and proximity services may be well met.

A D2D technology may work in an authorized frequency band or an unauthorized frequency band, and allows direct discovery and/or direct communication of multiple pieces of D2D UE under a condition of presence of network infrastructure or absence of the network infrastructure. The following three main D2D application scenarios exist:

1): UE1 and UE2 perform data interaction under coverage of a cellular network, user plane data does not pass through network infrastructure, and the application scenario is specifically implemented as shown by mode 1 in FIG. 1;

2): UE in a poorly covered/uncovered area performs relay transmission, and the application scenario is specifically implemented as shown by mode 2 in FIG. 1, that is, UE4 with poorer signal quality is allowed to communicate with a network through UE3 covered by the network in the vicinity, thereby helping an operating company to enlarge a coverage area and improve system capacity; and 3): under the condition that a cellular network may not work normally in case of earthquake or emergency, direct communication among equipment is allowed, and as shown by mode 3 in FIG. 1, UE5, UE6 and UE7 perform one-hop or multi-hop data communication in a manner that communication between the control plane data and user plane data does not pass through the network infrastructure.

A D2D technology usually includes a D2D discovery technology and a D2D communication technology, wherein the D2D discovery technology refers to a technology used to judge/determine that two or more pieces of D2D UE are adjacent (for example, within a direct D2D communication range) or used to judge/determine that first UE is adjacent to second UE. D2D UE may usually be discovered by each other by sending or receiving discovery signals/information, and under the condition of presence of cellular network coverage, the D2D discovery of the D2D UE may be assisted by a network; and D2D communication technology refers to a technology capable of realizing direct communication in a manner that a part or all of communication data between the D2D UE does not pass through network infrastructure.

At present, a main D2D discovery method includes that D2D UE (first UE) sends identity information capable of identifying the D2D UE which sends the discovery information, and discovery-end D2D UE (second UE) performs corresponding D2D UE identity information searching and identifies the received D2D identity information, thereby finishing a D2D UE discovery process. However, because of diversity of D2D communication modes, it may be difficult to meet a requirement on D2D communication diversity by only including identity information in a discovery message.

The abovementioned flow is easy to implement, but it is not enough to only contain identity information in discovery information in consideration of various D2D communication modes mentioned before.

For the problem, there is yet no effective solution.

SUMMARY

The embodiment of the disclosure provides methods for receiving device discovery information and sending device discovery information, and UE, so as to at least solve the technical problem of difficulty in meeting a requirement on D2D communication diversity caused by the related technological feature that only an Identifier (ID) is contained in device discovery information.

According to one aspect of the embodiment of the disclosure, a method for receiving device discovery information is provided, which includes that: first UE receives device discovery information sent by second UE, wherein the device discovery information contains at least one piece of the following information: UE identification information and attribute information of the UE; and the first UE performs D2D discovery and/or D2D communication under the condition that the device discovery information is consistent with a preset condition.

Preferably, the UE identification information includes at least one piece of the following information: a D2D discovery ID of the second UE and a D2D discovery ID of UE which is expected to be discovered by the second UE.

Preferably, the UE identification information includes at least one piece of the following information: a device ID of the second UE, a device ID of UE which is expected to be discovered by the second UE, an ID allocated by a network entity and used for device discovery and a UE ID determined according to a system specification.

Preferably, the network entity includes, but not limited to, at least one of the followings: an Evolved Node B (eNB), a Mobility Management Entity (MME), a D2D server and a network element which executes device discovery ID allocation.

Preferably, UE identification information of different UE is allowed to be with different lengths.

Preferably, the attribute information of the UE includes at least one piece of the following information: attribute information of the second UE and attribute information of the UE which is expected to be discovered by the second UE.

Preferably, the attribute information of the UE includes at least one piece of the following information: an attribute update count value, UE capability information, UE type information, UE group information, UE state information, UE coverage information and application related information.

Preferably, the attribute update count value is used for indicating an updating condition of at least one piece of the following attribute information of the UE: the UE capability information, the UE type information, the UE group information, the UE state information, the UE coverage information and the application related information; and/or the UE capability information includes at least one piece of the following information: a UE power level, information about whether the UE has a relay capability or not, information about whether the UE has a D2D communication capability or not and a D2D capability profile, wherein the UE power level is used for indicating a power level of current residual power of the UE, information about whether the UE has the relay capability or not is used for indicating whether the UE can forward control signalling and/or service data of other D2D UE or not, information about whether the UE has the D2D communication capability or not is used for indicating whether the UE can perform D2D communication with the other D2D UE or not, and the D2D capability profile is used for indicating a D2D capability set of the UE; and/or the UE type information includes at least one piece of the following information: a UE priority and a UE type; and/or the UE group information includes a D2D group ID of the D2D UE; and/or the UE state information is used for indicating a state of the UE, wherein the state includes: a connected state and/or an idle state; and/or the UE coverage information is used for indicating at least one piece of the following information: information about whether the UE is covered by an eNB or not, a serving eNB of the UE and a discovery area of the UE; and/or the application related information includes attribute information related to a D2D application.

Preferably, the power level of the current residual power includes one of the followings: unlimited, high, middle and low, whether the UE has the relay capability or not is implicitly indicated by the power level of the UE, and a D2D capability includes at least one of the followings: a D2D communication capability, the relay capability, the power level, a transmission mode, multi-antenna, retransmission, security, multimode multi-system supporting, a load indicator and a supported service type; and/or the UE type includes at least one of: an emergency help calling user, an ordinary user and a system management user; and/or the D2D group ID of the D2D UE contains D2D group information of one or more D2D groups to which the UE belongs; and/or the state of the UE is indicated in one of manners as follows: an explicit state field, implicit indication with a D2D discovery ID and implicit indication with a resource for sending the discovery information, wherein different resource sets bearing the device discovery information are allocated to the UE in different states; and/or whether the UE is covered by the eNB or not is indicated in one of manners as follows: indication through an explicit field and identification through UE serving eNB indication information, wherein the UE serving eNB indication information is an ID used for distinguishing adjacent eNB s; and/or the attribute information related to the D2D application includes, but not limited to, at least one of the followings: an application type, an application ID and specific application information.

Preferably, the D2D discovery ID and the resource set bearing the device discovery information are broadcasted to the second UE by the eNB via an air interface or sent to the second UE through special signalling, wherein the D2D discovery ID and the resource set bearing the device discovery information are pre-configured by a system.

Preferably, the resource set bearing the device discovery information includes any combination of resources as follows: time, a frequency point and a code.

Preferably, the ID used for distinguishing the adjacent eNBs includes at least one of: a UE serving eNB ID, a UE serving cell ID and a UE serving cell physical ID.

Preferably, the ID used for distinguishing the adjacent eNBs is an ID configured by a network manager for each eNB to distinguish the adjacent eNBs, or is an ID that each eNB actively selects own distinguishing ID, and performs interaction, via an X2 interface, with the eNB in an adjacent cell to ensure uniqueness of the distinguishing ID.

Preferably, a message bearing the ID configured to distinguish the adjacent eNBs in the X2 interface includes at least one of: an X2 establishment message and an adjacent cell configuration message.

Preferably, before the second UE sends the device discovery information, the method further includes that: the first UE and/or the second UE receive/receives the IDs sent by own eNBs in the air interface broadcasting manner or through the proprietary signalling to distinguish the adjacent eNBs.

Preferably, the step that the second UE sends the device discovery information includes that: the second UE sends the device discovery information through a synchronous signal and/or a broadcast channel.

Preferably, the step that the first UE executes D2D discovery and/or D2D communication under the condition that the device discovery information is consistent with the preset condition includes that: the first UE sends a discovery response message to the second UE under the condition that a D2D discovery ID of the UE which is expected to be discovered by the second UE in the device discovery information is the same as a D2D discovery ID of the first UE.

Preferably, the step that the first UE sends the discovery response message to the second UE includes that: the first UE directly sends the discovery response message to the second UE; or, the first UE sends the discovery response message to the second UE through a network entity.

Preferably, after the first UE sends the discovery response message to the second UE, the method further includes that: the second UE receives the discovery response message.

Preferably, the step that the first UE executes D2D discovery and/or D2D communication under the condition that the device discovery information is consistent with the preset condition includes that: under the condition that the device discovery information contains an attribute update count value, the first UE judges whether the information of the second UE and the corresponding attribute update count value have been received or not, and if the information of the first UE and the corresponding attribute update count value have not been received and/or the received attribute update count value is different, the first UE stores the attribute update count value in the device discovery information, and acquires other attribute information; and/or under the condition that the device discovery information contains relay capability information of the second UE, the first UE stores the second UE, and when the first UE searches for a relay node for signalling and data forwarding, the second UE is employed as a candidate relay node; and/or under the condition that the device discovery information contains indication information about whether the second UE has D2D communication capability information or not, the first UE judges whether to initiate D2D communication with the second UE or not according to the indication information about whether the second UE has the D2D communication capability information or not; and/or under the condition that the device discovery information contains D2D capability profile information of the second UE, the first UE selects a plurality of communication parameters when initiating establishment of a D2D communication connection with the second UE according to the D2D capability profile information of the second UE; and/or under the condition that the device discovery information contains type information of the second UE, the first UE preferably responds to UE with a high priority and/or UE of an emergency help calling user according to the type information of the second UE; and/or under the condition that the device discovery information contains group information of the second UE and the first UE also belongs to a group indicated by the group information, the first UE executes D2D group-based device discovery according to the group information of the second UE; and/or under the condition that the device discovery information contains state information of the second UE, the first UE executes D2D discovery and D2D communication flows according to a state of the second UE; and/or under the condition that the device discovery information contains coverage information of the second UE, the first UE finishes device discovery and/or D2D communication connection establishment with the second UE through a serving eNB of the first UE according to the coverage information of the second UE; and/or under the condition that the device discovery information contains application related information of the second UE, the first UE judges whether an application indicated by the application related information of the second UE is an application in which the first UE is interested or not, and if YES, the first UE presents preset information corresponding to the application in which the first UE is interested.

Preferably, the step that the first UE executes the D2D discovery and D2D communication flows according to the state of the second UE includes that: under the condition that the second UE is in an idle state, the first UE pages the second UE to enable the second UE to access a network and establish a communication connection when the first UE initiates D2D communication with the second UE; and/or under the condition that the second UE is in a connected state, the first UE searches for a serving eNB of the second UE, and establishes the D2D communication connection through the found serving eNB.

Preferably, the step that the first UE executes D2D discovery and/or D2D communication under the condition that the device discovery information contains the attribute information of the UE which is expected to be discovered by the second UE includes that: the first UE judges whether its own attribute is consistent with the attribute information, in the device discovery information, of the UE which is expected to be discovered by the second UE or not, and if YES, the first UE sends the discovery response message to the second UE directly or through the network entity.

Preferably, the discovery response message contains the D2D discovery ID of the first UE and/or the D2D discovery ID of the second UE.

According to another aspect of the embodiment of the disclosure, a method for sending device discovery information is provided, which includes that: first UE sends device discovery information, wherein the device discovery information contains UE identification information and/or attribute information of the UE.

Preferably, the step that the first UE sends the device discovery information includes that: the first UE sends the device discovery information which is borne in a synchronous signal and/or a broadcast channel.

Preferably, the UE identification information includes: a D2D discovery ID of the first UE and/or a D2D discovery ID of UE which is expected to be discovered by the first UE.

Preferably, the UE identification information includes at least one piece of the following information: a device ID of the first UE, a device ID of UE which is expected to be discovered by the first UE, an ID allocated by a network entity and used for device discovery and a UE ID determined according to a system specification.

Preferably, the network entity includes, but not limited to, at least one of: an eNB, an MME, a D2D server and a network element which executes device discovery ID allocation.

Preferably, UE identification information of different UE is allowed to be with different lengths.

Preferably, the attribute information of the UE includes at least one of: attribute information of the first UE and/or attribute information of the UE which is expected to be discovered by the first UE.

Preferably, the attribute information of the UE includes at least one piece of the following information: an attribute update count value, UE capability information, UE type information, UE group information, UE state information, UE coverage information and application related information.

Preferably, the attribute update count value is used for indicating an updating condition of at least one piece of the following attribute information of the UE: the UE capability information, the UE type information, the UE group information, the UE state information, the UE coverage information and the application related information; and/or the UE capability information includes at least one piece of the following information: a UE power level, information about whether the UE has a relay capability or not, information about whether the UE has a D2D communication capability or not and a D2D capability profile, wherein the UE power level is used for indicating a power level of current residual power of the UE, information about whether the UE has the relay capability or not is used for indicating whether the UE can forward control signalling and/or service data of other D2D UE or not, information about whether the UE has the D2D communication capability or not is used for indicating whether the UE can perform D2D communication with the other D2D UE or not, and the D2D capability profile is used for indicating a D2D capability set of the UE; and/or the UE type information includes at least one piece of the following information: a UE priority and a UE type; and/or the UE group information includes a D2D group ID of the D2D UE; and/or the UE state information is used for indicating a state of the UE, wherein the state includes: a connected state and/or an idle state; and/or the UE coverage information is used for indicating at least one piece of the following information: information about whether the UE is covered by an eNB or not, a serving eNB of the UE and a discovery area of the UE; and/or the application related information includes attribute information related to a D2D application.

Preferably, the power level of the current residual power includes one of: unlimited, high, middle and low, whether the UE has the relay capability or not is implicitly indicated by the power level of the UE, and a D2D capability includes at least one of: a D2D communication capability, the relay capability, the power level, a transmission mode, multi-antenna, retransmission, security, multimode multi-system supporting, a load indicator and a supported service type; and/or the UE type includes at least one of: an emergency help calling user, an ordinary user and a system management user; and/or the D2D group ID of the D2D UE contains D2D group information of one or more D2D groups to which the UE belongs; and/or the state of the UE is indicated in one of manners as follows: an explicit state field, implicit indication with a D2D discovery ID and implicit indication with a resource for sending the discovery information, wherein different resource sets bearing the device discovery information are allocated to the UE in different states; and/or whether the UE is covered by the eNB or not is indicated in one of manners as follows: indication through an explicit field and identification through UE serving eNB indication information, wherein the UE serving eNB indication information is an ID configured to distinguish adjacent eNBs; and/or the attribute information related to the D2D application includes, but not limited to, at least one piece of the following information: an application type, an application ID and specific application information.

According to another aspect of the embodiment of the disclosure, UE is provided, which includes: a receiving element, configured to receive device discovery information sent by another piece of UE, wherein the device discovery information contains at least one piece of the following information: UE identification information and attribute information of the UE; and an execution element, configured to execute D2D discovery and/or D2D communication under the condition that the device discovery information is consistent with a preset condition.

Preferably, the attribute information of the UE includes at least one piece of the following information: attribute information of the other UE and attribute information of UE which is expected to be discovered by the other UE.

Preferably, the attribute information of the UE includes at least one piece of the following information: an attribute update count value, UE capability information, UE type information, UE group information, UE state information, UE coverage information and application related information.

Preferably, the attribute update count value is used for indicating an updating condition of at least one piece of the following attribute information of the UE: the UE capability information, the UE type information, the UE group information, the UE state information, the UE coverage information and the application related information; and/or the UE capability information includes at least one of: a UE power level, whether the UE has a relay capability or not, whether the UE has a D2D communication capability or not and a D2D capability profile, wherein the UE power level is configured to indicate a power level of current residual power of the UE, whether the UE has the relay capability or not is configured to indicate whether the UE can forward control signalling and/or service data of other D2D UE or not, whether the UE has the D2D communication capability or not is configured to indicate whether the UE can perform D2D communication with the other D2D UE or not, and the D2D capability profile is configured to indicate a D2D capability set of the UE; and/or the UE type information includes at least one of: a UE priority and a UE type; and/or the UE group information includes a D2D group ID of the D2D UE; and/or the UE state information is configured to indicate a state of the UE, wherein the state includes: a connected state and/or an idle state; and/or the UE coverage information is configured to indicate at least one of: whether the UE is covered by an eNB or not, a serving eNB of the UE and a discovery area of the UE; and/or the application related information includes attribute information related to a D2D application.

Preferably, the power level of the current residual power includes one of: unlimited, high, middle and low, whether the UE has the relay capability or not is implicitly indicated by the power level of the UE, and a D2D capability includes at least one of: a D2D communication capability, the relay capability, the power level, a transmission mode, multi-antenna, retransmission, security, multimode multi-system supporting, a load indicator and a supported service type; and/or the UE type includes at least one of: an emergency help calling user, an ordinary user and a system management user; and/or the D2D group ID of the D2D UE contains D2D group information of one or more D2D groups to which the UE belongs; and/or the state of the UE is indicated in on one of manners as follows: an explicit state field, implicit indication with a D2D discovery ID and implicit indication with a resource for sending the discovery information, wherein different resource sets bearing the device discovery information are allocated to the UE in different states; and/or whether the UE is covered by the eNB or not is indicated in one of manners as follows: indication through an explicit field and identification through UE serving eNB indication information, wherein the UE serving eNB indication information is an ID configured to distinguish adjacent eNBs; and/or the attribute information related to the D2D application includes, but not limited to, at least one of: an application type, an application ID and specific application information.

Preferably, the execution element is further configured to send a discovery response message to the other UE under the condition that a D2D discovery ID of the UE which is expected to be discovered by the other UE in the device discovery information is the same as a D2D discovery ID of the UE where the execution element is located.

Preferably, the execution element includes: a first execution component, configured to, under the condition that the device discovery information contains an attribute update count value, judge whether the information of the UE where the execution element is located and the corresponding attribute update count value have been received or not, and if the information of the UE where the execution element is located and the corresponding attribute update count value have not been received and/or the received attribute update count value is different, store the attribute update count value in the device discovery information, and acquire other attribute information; and/or a second execution component, configured to, under the condition that the device discovery information contains relay capability information of the other UE, store the other UE, and when the UE where the execution element is located searches for a relay node for signalling and data forwarding, employ the other UE as a candidate relay node; and/or a third execution component, configured to, under the condition that the device discovery information contains indication information about whether the other UE has D2D communication capability information or not, judge whether to initiate D2D communication with the other UE or not according to the indication information about whether the other UE has the D2D communication capability information or not; and/or a fourth execution component, configured to, under the condition that the device discovery information contains D2D capability profile information of the other UE, select a communication parameter when initiating establishment of a D2D communication connection with the other UE according to the D2D capability profile information of the other UE; and/or a fifth execution component, configured to, under the condition that the device discovery information contains type information of the other UE, preferably respond to UE with a high priority and/or UE of an emergency help calling user according to the type information of the other UE; and/or a sixth execution component, configured to, under the condition that the device discovery information contains group information of the other UE and the UE where the execution element is located also belongs to a group indicated by the group information, execute D2D group-based device discovery according to the group information of the other UE; and/or a seventh execution component, configured to, under the condition that the device discovery information contains state information of the other UE, execute D2D discovery and D2D communication flows according to a state of the other UE; and/or an eighth execution component, configured to, under the condition that the device discovery information contains coverage information of the other UE, finish device discovery and/or D2D communication connection establishment with the other UE through a serving eNB of the UE where the execution element is located according to the coverage information of the other UE; and/or a ninth execution component, configured to, under the condition that the device discovery information contains application related information of the other UE, judge whether an application indicated by the application related information of the other UE is an application in which the UE where the execution element is located is interested or not, and if YES, present preset information corresponding to the application in which the UE where the execution element is located is interested.

According to another aspect of the embodiment of the disclosure, UE is provided, which includes: a sending element, configured to send device discovery information, wherein the device discovery information contains UE identification information and/or attribute information of the UE.

Preferably, the sending element is further configured to send the device discovery information which is born in a synchronous signal and/or a broadcast channel.

Preferably, the attribute information of the UE includes at least one piece of the following information: an attribute update count value, UE capability information, UE type information, UE group information, UE state information, UE coverage information and application related information.

Preferably, the attribute update count value is used for to indicating an updating condition of at least one piece of the following attribute information of the UE: the UE capability information, the UE type information, the UE group information, the UE state information, the UE coverage information and the application related information; and/or the UE capability information includes at least one piece of the following information: a UE power level, information about whether the UE has a relay capability or not, information about whether the UE has a D2D communication capability or not and a D2D capability profile, wherein the UE power level is used for indicating a power level of current residual power of the UE, information about whether the UE has the relay capability or not is used for indicating whether the UE can forward control signalling and/or service data of other D2D UE or not, information about whether the UE has the D2D communication capability or not is used for indicating whether the UE can perform D2D communication with the other D2D UE or not, and the D2D capability profile is used for indicating a D2D capability set of the UE; and/or the UE type information includes at least one piece of the following information: a UE priority and a UE type; and/or the UE group information includes a D2D group ID of the D2D UE; and/or the UE state information is used for indicating a state of the UE, wherein the state includes: a connected state and/or an idle state; and/or the UE coverage information is used for indicating at least one piece of the following information: information about whether the UE is covered by an eNB or not, a serving eNB of the UE and a discovery area of the UE; and/or the application related information includes attribute information related to a D2D application.

In the embodiment of the disclosure, the device discovery information sent by the second UE contains the attribute information of the UE, so that the UE receiving the device discovery information may further determine whether to perform D2D discovery and/or D2D communication or not according to the attribute information of the UE therein. In such a manner, the problem of difficulty in meeting a requirement on D2D communication diversity caused by containing of only an ID in the device discovery information in the related technology is effectively solved, and the technical effect of improving D2D communication effectiveness and flexibility is achieved.

BRIEF DESCRIPTION OF THE DRAWINGS

The drawings described here are adopted to provide further understanding of the disclosure, and form a part of the disclosure. Schematic embodiments of the disclosure and description thereof are adopted to explain the disclosure and not intended to form improper limits to the disclosure. In the drawings:

FIG. 1 is a diagram of a communication mode of a D2D system according to the related technology;

FIG. 2 is a preferred flowchart of a method for receiving device discovery information according to an embodiment of the disclosure;

DETAILED DESCRIPTION OF THE EMBODIMENTS

Figure 3:
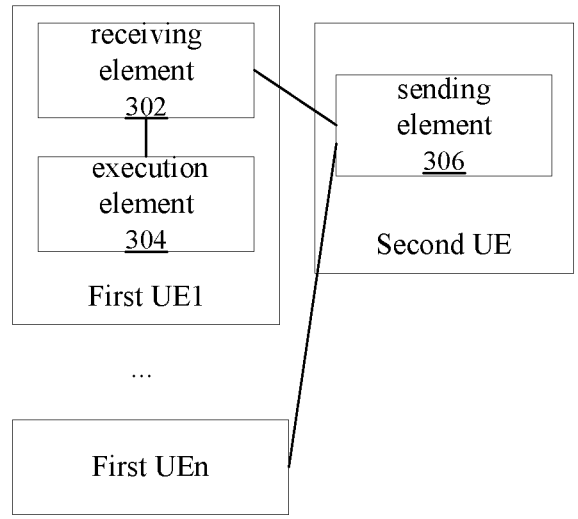
FIG. 3 is a preferred structure diagram of a D2D system of UE according to an embodiment of the disclosure.

The disclosure is described below with reference to the drawings and embodiments in detail. It is important to note that the embodiments in the disclosure and characteristics in the embodiments can be combined under the condition of no conflicts.

The embodiment of the disclosure provides a preferred method for receiving device discovery information, and as shown in FIG. 2, the method includes the following steps:

Step 202: a first UE receives device discovery information sent by a second UE, wherein the device discovery information contains at least one piece of the following information: UE identification information and attribute information of the UE; and Step 204: the first UE executes D2D discovery and/or D2D communication under the condition that the device discovery information is consistent with a preset condition.

In a preferred embodiment, the device discovery information sent by the second UE contains the attribute information of the UE, so that the UE receiving the device discovery information may further determine whether to execute D2D discovery and/or D2D communication or not according to the attribute information of the UE therein. In such a manner, the problem of difficulty in meeting a requirement on D2D communication diversity caused by containing of only an ID in the device discovery information in the related technology is effectively solved, and the technical effect of improving D2D communication effectiveness and flexibility is achieved.

Preferably, both the first UE and the second UE enable a D2D discovery function. Before Step 202, the method further includes that: the second UE sends the device discovery information, wherein the device discovery information contains the UE identification information and/or the attribute information of the UE.

In order to effectively discover the UE, in a preferred embodiment, the UE identification information (i.e. a UE ID) in the device discovery information includes, but not limited to: a D2D discovery ID of the second UE and/or a D2D discovery ID of UE which is expected to be discovered by the second UE, that is, the device discovery information may contain D2D discovery identification information of the second UE to enable other UE to discover the second UE, and the device discovery information may further contain a D2D discovery ID of the UE which is expected to be discovered by the second UE, so that the other UE may determine that whether it is the UE which is expected to be discovered by the second UE or not through the D2D discovery ID.

Preferably, the D2D discovery ID of the UE may be a device ID of the UE, and may also be an ID allocated by a network entity for device discovery or another UE ID specified according to a system specification. It is worth noting that forms of the above-listed device IDs of the UE are only intended to better describe the disclosure, and other UE IDs may also be adopted as long as the adopted UE IDs may uniquely identify the UE. The network entity may include, but not limited to, at least one of: an eNB, an MME, a D2D server and other network elements which execute device discovery ID allocation.

In order to further improve flexibility of the UE ID in the device discovery information, a system allows setting of UE identification information with different lengths for different UE.

The UE ID may be the D2D discovery ID of the UE which is expected to be discovered by the second UE, and may also be D2D discovery identification information which corresponds to the UE expected to be discovered and has been acquired before the second UE sends the D2D discovery ID of the UE expected to be discovered by the second UE. Preferably, when the second UE sends the device discovery information, both the D2D discovery ID of the UE which is expected to be discovered by the second UE and a D2D discovery ID of the second UE may be contained.

The attribute information of the UE in the device discovery information is described specifically as follows:

the attribute information of the UE includes: attribute information of the second UE and attribute information of the UE which is expected to be discovered by the second UE. That is, one kind of information may be contained, both kinds may also be contained, and the information may be selectively contained according to a requirement.

Preferably, the attribute information of the UE includes, but not limited to, at least one of the followings: an attribute update count value, UE capability information, UE type information, UE group information, UE state information, UE coverage information and application related information. The above-listed attribute information of the UE is specifically described below.

1) The attribute update count value is used for indicating, but not limited to, an updating condition of at least one piece of the following attribute information of the UE: the UE capability information, the UE type information, the UE group information, the UE state information, the UE coverage information and the application related information.

2) The UE capability information includes, but not limited to, at least one piece of the following information: a UE power level, information about whether the UE has a relay capability or not, information about whether the UE has a D2D communication capability or not and a D2D capability profile, wherein the UE power level is used for indicating a power level of current residual power of the UE, whether the UE has the relay capability or not is used for indicating whether the UE can forward control signalling and/or service data of other D2D UE or not, information about whether the UE has the D2D communication capability or not is used for indicating whether the UE can perform D2D communication with the other D2D UE or not, and the D2D capability profile is used for indicating a D2D capability set of the UE; and preferably, the power level of the current residual power includes one of the followings: unlimited, high, middle and low, wherein whether the UE has the relay capability or not is implicitly indicated by the power level of the UE, and a D2D capability includes at least one of the followings: a D2D communication capability, the relay capability, the power level, a transmission mode, multi-antenna, retransmission, security, multimode multi-system supporting, a load indicator and a supported service type.

3) The UE type information includes, but not limited to, at least one of: a UE priority and a UE type; and preferably, the UE type may include, but not limited to, an emergency help calling user, an ordinary user and a system management user.

4) The UE group information includes a D2D group ID of the D2D UE; preferably, the D2D group ID of the D2D UE contains D2D group information of one or more D2D groups to which the UE belongs; that is, one or more pieces of D2D group information may be contained in the device discovery information sent by the second UE at one time.

5) The UE state information is used for indicating a state of the UE, wherein the state includes: a connected state and/or an idle state;

preferably, the state of the UE may be indicated, but not limited to, in on one of manners as follows: an explicit state field (for example: 0 represents the idle state and 1 represents the connected state), implicit indication with a D2D discovery ID (for example: a plurality of high bits of the D2D discovery ID are used for indicating the group where the UE is located) and implicit indication with a resource for sending the discovery information, wherein different resource sets bearing the device discovery information are allocated to the UE in different states; the state information of the UE is indicated by the explicit state field; specifically, different D2D discovery ID sets are allocated to the UE in different states, and the state information of the UE may be implicitly indicated by the D2D discovery ID in the device discovery information; or different resource sets bearing the device discovery information are allocated to the UE in different states, and the state information of the UE is implicitly indicated by the resource for sending the device discovery information.

Preferably, the D2D discovery ID and the resource set bearing the device discovery information are sent to the second UE by an eNB in an air interface broadcasting manner or through proprietary signalling, wherein the D2D discovery ID and the resource set bearing the device discovery information are pre-configured by the system; and the resource set bearing the device discovery information includes, but not limited to any combination of time, a frequency point and a code resource.

6) The UE coverage information is used for indicating, but not limited to, at least one of the followings: whether the UE is covered by an eNB or not, a serving eNB of the UE and a discovery area of the UE;

preferably, whether the UE is covered by the eNB or not is indicated in one of manners as follows: indication through an explicit field (for example: 0 represents no eNB coverage and 1 represents existence of eNB coverage) and identification through UE serving eNB indication information, wherein the UE serving eNB indication information is an ID used for distinguishing adjacent eNBs, and special UE serving eNB indication information may be allocated for identification; and the UE serving eNB indication information may include, but not limited to: a UE serving eNB ID, or a UE serving cell ID, or a UE serving cell physical ID or another ID which may be used for distinguishing adjacent eNBs.

In a preferred embodiment, the IDs used for distinguishing the adjacent eNBs are IDs configured for each eNB and the adjacent eNB by a network manager to distinguish the adjacent eNBs, or the eNBs actively select own distinguishing IDs and perform interaction with the eNBs in adjacent cells to ensure uniqueness of the distinguishing IDs through X2 interfaces, and after acquiring the distinguishing IDs of the adjacent eNBs, the eNBs may send them to corresponding UE in the air interface broadcasting manner or through the proprietary signalling; that is, the first UE and/or the second UE receive/receives the IDs sent by their/its eNBs in the air interface broadcasting manner or through the proprietary signalling to distinguish the adjacent eNBs. A message bearing the distinguishing ID of the eNB in the X2 interface may include, but not limited to, at least one of the follows: an X2 establishment message, an adjacent cell configuration message or another X2 message capable of bearing the distinguishing ID of the eNB.

7) The application related information includes attribute information related to a D2D application, and the attribute information related to the D2D application may preferably include, but not limited to, at least one of the followings: an application type, an application ID and specific application information.

Preferably, the device discovery information received by the first UE from the second UE in Step 202 may be sent by the second UE through a synchronous signal and/or a broadcast channel.

Step 204, i.e. a process of processing after the first UE receives the device discovery information, is specifically described below.

If the D2D discovery ID, which is contained in the device discovery information received by the first UE, of the UE which is expected to be discovered by the second UE includes the D2D discovery ID of the first UE, or, the D2D discovery ID, which is contained in the device discovery information, of the UE which is expected to be discovered by the second UE is the same as the D2D discovery ID of the first UE when there is only one piece of UE which is expected to be discovered by the second UE, the first UE sends the discovery response message to the second UE.

Preferably, the first UE may send the discovery response message to the second UE directly, and may also send the discovery response message to the second UE through a network entity.

Preferably, after the first UE sends the discovery response message to the second UE, the method may further include that: the second UE receives the discovery response message. In a preferred embodiment, the discovery response message received by the second UE may initiate D2D communication with the first UE, and may also play a role in notification only without initiating D2D communication therebetween.

In Step 204, the following main processing strategies are adopted for different message types in the device discovery information.

1) If the device discovery information contains an attribute update count value, the first UE judges whether the information of the UE sending the device discovery information and the corresponding attribute update count value have been received or not, and if the information of the UE and the corresponding attribute update count value have not been received and/or the received attribute update count values are different, the first UE stores the attribute update count value in the device discovery information, and acquires other attribute information, otherwise the first UE does not acquire the other attribute information.

2) If the device discovery information contains relay capability information of the second UE, the first UE stores the second UE, and when the first UE searches for a relay node for signalling and data forwarding, the second UE is employed as a candidate relay node.

3) If the device discovery information contains indication information about whether the second UE has D2D communication capability information or not, the first UE judges whether to initiate D2D communication with the second UE or not according to the indication information about whether the second UE has the D2D communication capability information or not.

4) If the device discovery information contains D2D capability profile information of the second UE, the first UE selects a plurality of communication parameters when initiating establishment of a D2D communication connection with the second UE according to the D2D capability profile information of the second UE.

5) If the device discovery information contains type information of the second UE, the first UE preferably responds to UE with a high priority and/or UE of which the type is an emergency help calling user according to the type information of the second UE.

6) If the device discovery information contains group information of the second UE and the first UE also belongs to the group indicated by the group information, the first UE executes D2D group-based device discovery according to the group information of the second UE.

7) If the device discovery information contains state information of the second UE, the first UE executes D2D discovery and D2D communication flows according to a state of the second UE;

preferably, under the condition that the second UE is in an idle state, the first UE pages the second UE to enable the second UE to access a network and establish a communication connection when initiating D2D communication with the second UE; and under the condition that the second UE is in a connected state, the first UE searches for a serving eNB of the second UE, and establishes the D2D communication connection through the found serving eNB.

8) If the device discovery information contains coverage information of the second UE, the first UE finishes device discovery and/or D2D communication connection establishment with the second UE through a serving eNB of the first UE according to the coverage information of the second UE.

9) If the device discovery information contains application related information of the second UE, the first UE judges whether an application indicated by the application related information of the second UE is an application in which the first UE is interested or not, and if YES, the first UE presents preset information corresponding to the application in which the first UE is interested.

In a preferred embodiment, the step that the first UE executes the D2D discovery and D2D communication flows according to the state of the second UE includes that:

preferably, in Step 204, the first UE judges whether its own attribute is consistent with the attribute information of the UE which is expected to be discovered by the second UE in the device discovery information or not, and if YES, the first UE sends the discovery response message to the second UE directly or through the network entity. Preferably, the discovery response message sent to the second UE by the first UE may simultaneously contain the D2D discovery ID of the first UE and/or the D2D discovery ID of the second UE.

One embodiment further provides a D2D communication system, which includes multiple pieces of first UE and one piece of second UE. The system is configured to implement the abovementioned embodiments and preferred embodiments, and that what has been described will not be repeated. For example, a term "unit" or "component", used below, is a combination of software and/or hardware capable of realizing preset functions. The device described in the following embodiment is preferably implemented by software, but the implementation of the device with hardware or the combination of software and hardware is also possible and conceivable. FIG. 3 is a preferred structure of a D2D communication system according to an embodiment of the disclosure, and as shown in FIG. 3, the first UE includes: a receiving element 302 and an execution element 304, and the second UE includes: a sending element 306. It is worth noting that the first UE and the second UE are peer UE, the second UE also includes each functional element in the first UE, and similarly, the first UE also includes each functional element in the second UE. The structure is specifically described below.

The sending element 306 is configured to send device discovery information, wherein the device discovery information contains at least one piece of the following information: UE identification information and attribute information of the UE.

The receiving element 302 is coupled with the sending element 306, and is configured to receive the device discovery information sent by the second UE, wherein the device discovery information contains at least one piece of the following information: the UE identification information and the attribute information of the UE; and The execution element 304 is coupled with the receiving element 302, and is configured to execute D2D discovery and/or D2D communication under the condition that the device discovery information is consistent with a preset condition.

Limitations to the device discovery information are the same as limitations to the information in description about the method, and will not be repeated here.

In a preferred embodiment, the execution element 304 is further configured to send a discovery response message to the second UE under the condition that a D2D discovery ID, which is contained in the device discovery information, of UE which is expected to be discovered by the second UE is the same as a D2D discovery ID of the first UE. The second UE receives the discovery response message, and preferably, the second UE may initiate D2D communication with the first UE in response to the discovery response message.

In a preferred embodiment, the execution element may include the following execution components:

1) a first execution component configured to, under the condition that the device discovery information contains an attribute update count value, judge whether information of the UE sending the device discovery information and the corresponding attribute update count value have been received or not, and if the information of the UE and the corresponding attribute update count value have not been received and/or the received attribute update count values are different, store the attribute update count value in the device discovery information, and acquire other attribute information, otherwise not acquire the other attribute information;

2) a second execution component configured to, under the condition that the device discovery information contains relay capability information of the second UE, store the second UE, and when searching for a relay node for signalling and data forwarding, employ the second UE as a candidate relay node;

3) a third execution component configured to, under the condition that the device discovery information contains indication information about whether the second UE has D2D communication capability information or not, judge whether to initiate D2D communication with the second UE or not according to the indication information about whether the second UE has the D2D communication capability information or not;

4) a fourth execution component configured to, under the condition that the device discovery information contains D2D capability profile information of the second UE, select a plurality of communication parameters when initiating establishment of a D2D communication connection with the second UE according to the D2D capability profile information of the second UE;

5) a fifth execution component configured to, under the condition that the device discovery information contains type information of the second UE, preferably respond to UE with a high priority and/or UE of an emergency help calling user according to the type information of the second UE;

6) a sixth execution component configured to, under the condition that the device discovery information contains group information of the second UE and the first UE also belongs to a group indicated by the group information, execute D2D group-based device discovery according to the group information of the second UE;

7) a seventh execution component configured to, under the condition that the device discovery information contains state information of the second UE, execute D2D discovery and D2D communication flows according to a state of the second UE;

preferably, under the condition that the second UE is in an idle state, the first UE pages the second UE to enable the second UE to access a network and establish a communication connection when initiating D2D communication with the second UE; under the condition that the second UE is in a connected state, the first UE searches for a serving eNB of the second UE, and establishes the D2D communication connection through the found serving eNB;

8) an eighth execution component configured to, under the condition that the device discovery information contains coverage information of the second UE, finish device discovery and/or D2D communication connection establishment with the second UE through a serving eNB of the first UE according to the coverage information of the second UE; and 9) a ninth execution component configured to, under the condition that the device discovery information contains application related information of the second UE, judge whether an application indicated by the application related information of the second UE is an application in which the first UE is interested or not, and if YES, present preset information corresponding to the application in which the first UE is interested.

Figure 4:
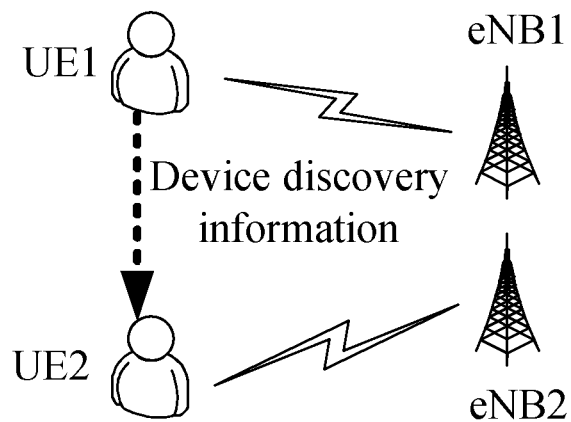
FIG. 4 is a diagram of sending device discovery information according to an embodiment of the disclosure.
Figure 5:
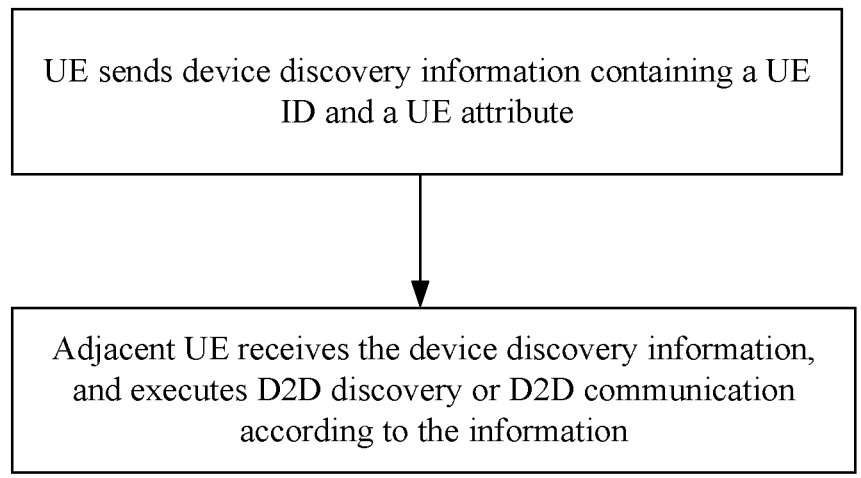
FIG. 5 is a flowchart of a method for sending device discovery information according to an embodiment of the disclosure.

Before D2D equipment perform D2D communication, it is necessary to finish discovering other adjacent D2D equipment. As shown in FIG. 4, D2D UE may be discovered by each other by sending or receiving discovery information, and the discovery information (i.e. the abovementioned device discovery information) includes identity information capable of identifying the D2D UE sending the discovery information and attribute information. Specifically, as shown in FIG. 5, D2D UE1 sends device discovery information containing a UE ID and a UE attribute, adjacent D2D UE may search for the device discovery information and parse the received device discovery information to identify an identity, capability, state, type, coverage, group and application condition of the D2D UE1, thereby finishing a D2D UE discovery process and probable D2D communication according to the information.

The methods for sending and receiving the device discovery information are specifically described for three communication modes of a D2D system shown in FIG. 1, and it is worth noting that the following specific embodiments are only intended to better describe the disclosure and not intended to for improper limits to the disclosure.

Preferred Embodiment I

In a preferred embodiment, it is mainly a corresponding method for sending device discovery information on the basis of a network coverage scenario (communication mode 1 in FIG. 1). In the preferred embodiment, both devices performing D2D discovery and communication are covered by eNBs, and the devices are assisted by the eNBs to perform D2D discovery and D2D communication. Detailed description is given below with reference to instance I to instance VII.

Instance I

A social application scenario is taken as an example, and Mary, John and Peter all have D2D UE. APP1 is a social application, and the social application may utilize a D2D UE discovery and communication function provided by a network side. It is supposed that Mary, John and Peter all have registered on APP1 and Mary is mutually added as a friend with John and Peter on APP1. If Mary decides to determine whether the friends are nearby or not through APP1 after the UE of Mary accesses a network, Mary runs APP1 through the UE, and enables the D2D discovery and communication function of the UE.

After the UE of Mary enables a D2D discovery and communication component, interaction between the D2D discovery and communication component on the UE side and a network-side entity (for example: an eNB, an MME, a ProSe Server or other network elements with a D2D management function) may be initiated, and it is necessary to allocate a D2D discovery ID. In addition, the network-side entity may also allocate the D2D discovery ID to the UE when the UE accesses or is attached to the network. The D2D discovery ID may be an ID specially configured for D2D device discovery, and may also adopt an existing ID, used for identifying the UE, of the network side, and for example, each of a Cell Radio Network Temporary Identity (CRNTI), an S Temporary Mobile Subscriber Identity (ST-MSI), an SI Application Protocol Identity (SIAPID), an International Mobile Subscriber Identity (IMSI), a Globally Unique Temporary UE Identity (GUTI) and an International Protocol (IP) may be used as the D2D discovery ID.

In addition, the UE of Mary and an eNB negotiate to acquire an air interface resource required by the sending of device discovery information, and the air interface resource used for sending the device discovery information may be a synchronous signal and/or a broadcast channel resource (for example: a set of time, frequency and code resources). The resource may be sent to the UE by the eNB in a manner of special signaling, and the eNB may also broadcast a resource set for sending the device discovery information and then the UE acquires an available resource therein in a competition manner.

Figure 6:
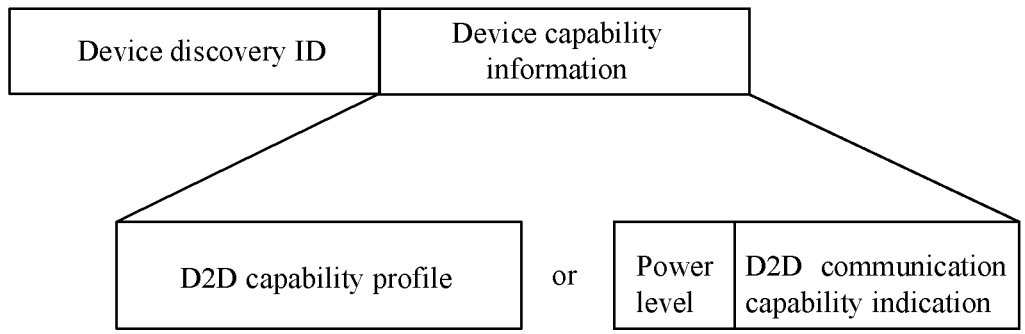
FIG. 6 is a diagram of a D2D discovery information sending format according to instance I of the disclosure.

After the D2D discovery ID and the air interface resource for sending the device discovery information are determined, the device discovery information of the UE of Mary is assembled, and a format of the assembled device discovery information may be shown in FIG. 6. The device discovery information includes a D2D discovery ID allocated to the UE of Mary and a D2D capability profile. The D2D capability profile indicates a D2D capability set of the UE, for example: a D2D communication capability, a relay capability, a power level, a transmission mode, multi-antenna, retransmission and security). The type of the D2D capability profile is set by a system in a unified manner, and the UE selects a proper D2D capability profile according to own capability, and the selected proper D2D capability profile is contained in the device discovery information.

Optionally, the UE only indicates the power level of the UE and whether the UE has the D2D communication capability or not in the device discovery information. The power level of the UE indicates a current residual power level of the UE, for example: unlimited, high, middle and low, and information about whether the UE has the D2D communication capability or not indicates whether the UE can perform D2D communication with other D2D UE or not.

Optionally, the UE contains the power level of the UE and an indicator about whether the UE has the D2D communication capability or not in the device discovery information, and also contains the D2D capability profile, and the D2D capability profile mainly includes the capability information of the transmission mode, multi-antenna, retransmission, security and the like.

After the UE of Mary finishes assembling the device discovery information, the device discovery information is broadcasted on the air interface resource which is allocated or selected by competition. If John and Peter are nearby Mary at this moment and the UE of John and Peter also accesses the network and the APP1 and D2D discovery and communication components are enabled in the UE of John and Peter, the UE of John and Peter may detect the device discovery information sent by the UE of Mary in the broadcasting manner, and the UE of John and Peter receives and parses the device discovery information, and stores the D2D discovery ID corresponding to the UE of Mary and the device capability information of the UE of Mary in the device discovery information. When necessary, the D2D discovery and communication components of the UE of John and Peter send received D2D discovery ID list information to the network-side entity to require the network side to check whether the UE can be discovered by each other or not, and if the network side verifies that the UE can be discovered by each other, information about that the UE of Mary is nearby is presented to the UE of John and Peter through running APP1.

Furthermore, if the device capability information, stored by the UE of John, of the UE of Mary indicates that the UE of Mary has the D2D communication capability, the UE of John may initiate sending of a video file to the UE of Mary in a D2D manner when necessary. If the stored device capability information of the UE of Mary also includes the D2D capability profile indicator, the capabilities of power, transmission mode, multi-antenna, retransmission, security and the like of the UE of John and Mary are considered to establish a proper connection during establishment of a D2D communication connection between the UE of John and the UE of Mary. On the contrary, if the device capability information, stored by the UE of John, of the UE of Mary indicates that the UE of Mary does not have the D2D communication capability, the UE of John quits establishing the D2D communication connection with the UE of Mary.

Instance II

Instance II also takes a social application scenario as an example, and both Mary and John have D2D UE. APP1 is a social application, and the social application may utilize a D2D UE discovery and communication function provided by a network side. It is supposed that both Mary and John have registered on APP1 and Mary is mutually added as a friend with John on APP1. If Mary decides to have a look at whether friend John is nearby or not through APP1 after the UE of Mary accesses a network, APP1 runs on the UE of Marry, and the D2D discovery and communication function of the UE of Marry is enabled. The UE of Mary acquires a D2D discovery ID and an air interface resource which is used for sending device discovery information by virtue of flows similar to those in instance II.

Figure 7:
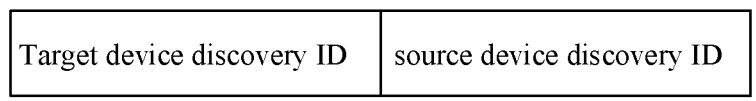
FIG. 7 is a diagram of a D2D discovery information sending format according to instance II of the disclosure.

After the D2D discovery IDs of the UE of Mary and the UE of John and the air interface resource for sending the device discovery information are determined, the UE of Mary assembles the device discovery information, and a format of the assembled device discovery information may be shown in FIG. 7. The device discovery information includes the D2D discovery ID (i.e. a target D2D discovery ID) allocated to the UE of John and the D2D discovery ID (i.e. a source D2D discovery ID) allocated to the UE of Mary.

After the UE of Mary finishes assembling the device discovery information, the device discovery information is broadcasted on the air interface resource which is allocated or selected by competition. If John is nearby Mary at this moment and the UE of John also accesses the network and the APP1 runs in the UE of John and a D2D discovery and communication component is enabled in the UE of John, the UE of John may detect the device discovery information broadcasted by the UE of Mary, and the UE of John receives and parses the device discovery information, and stores the target D2D discovery ID and the source D2D discovery ID in the device discovery information.

If the target D2D discovery ID parsed by John from the device discovery information is consistent with its own D2D discovery ID, the UE of John sends a discovery response message to the UE sending the device discovery information through a network entity or directly. The discovery response message at least contains the D2D discovery ID of the UE and the D2D discovery ID of the UE sending the device discovery information. The discovery response message may also be sent to the network-side entity through the UE of John, and the network-side entity forwards the discovery response message to the UE, sending the device discovery information, of Mary after receiving the discovery response message. Preferably, the network-side entity includes, but not limited to, an eNB, an MME, a D2D server and other network elements with a D2D service processing function.

After the UE of Mary receives the discovery response message forwarded by the network-side entity or directly sent by the UE of John, the UE of Mary determines that the UE of John is found, and the UE of Mary may initiate D2D communication with the UE of John when necessary.

Optionally, the device discovery information in instance II may also contain the device capability information in instance I.

Instance III

Mary and John have D2D UE, and after the UE of Mary accesses a network, the UE of Mary decides to enable a D2D discovery and communication function to look for adjacent D2D UE nearby. The UE of Mary acquires a D2D discovery ID and an air interface resource used for sending device discovery information by virtue of flows similar to those in instance I. In addition, the UE of Mary may also be identified by allocated air interface resource information used for sending the device discovery information. For example, a certain piece of UE may be uniquely identified by virtue of a combination of specific time, frequency and code resources of an air interface resource allocated by an eNB to send the device discovery information. Under such a condition, the device discovery information sent by the UE of Mary is not required to explicitly contain the D2D discovery ID, and the UE is implicitly indicated by the air interface resource for sending the device discovery information.

The network supports group-based discovery and communication, group here may be a group with a plurality of members or a group with a few of members, a Public Land Mobile Network (PLMN) may belong to a group, an operating company may also divide a group (similar to a short number group set for certain group company users) according to a group client, and in addition, users with UE may also set friend groups (for example, groups set by the users according to contact information in mobile phones). One piece of D2D UE may belong to a group, but may also simultaneously belong to multiple groups. Group-based discovery has the advantage that D2D UE may not know an ID of other adjacent UE but may judge whether the UE is adjacent UE in which a user is interested or not according to a group ID.

Figure 8:
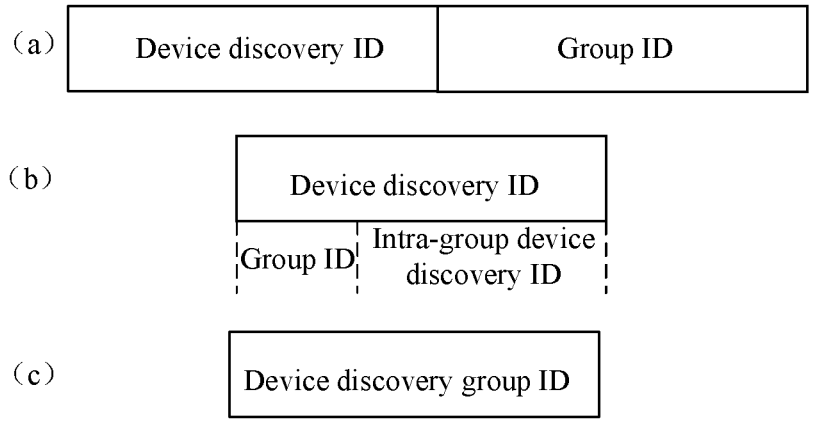
FIG. 8 is a diagram of a D2D discovery information sending format according to instance III of the disclosure.

If the UE of Mary is allocated into group 1 according to a certain rule and acquires an ID of group 1, the UE of Mary expects to initiate adjacent UE discovery based on group 1. After the D2D discovery ID, the air interface resource for sending the device discovery information and the ID of group 1 are determined, the UE of Mary assembles the device discovery information, and a format of the assembled device discovery information is shown in FIG. 8. The device discovery information may include the D2D discovery ID allocated to the UE of Mary and identification information of group 1, as shown by a in FIG. 8. In addition, the ID of the group to which the UE belongs is optionally implicitly contained through the D2D discovery ID, and for example, a plurality of high order bits of the D2D discovery ID are used for indicating the group where the UE is located, as shown by b in FIG. 8. In order to reduce group identification information overhead, the device discovery information sent by the air interface resource may only contain one piece of D2D group information. If the UE simultaneously belongs to multiple groups, multiple pieces of device discovery information may be sent, and different device discovery information contains different group IDs.

After the UE of Mary finishes assembling the device discovery information, the device discovery information is sent on the air interface resource which is allocated or selected by competition in a broadcasting manner. If John is nearby Mary at this moment and the UE of John also accesses the network and a D2D discovery and communication component is enabled, the UE of John may detect the device discovery information broadcasted by Mary. The UE of John receives and parses the device discovery information, and stores the D2D discovery ID corresponding to the UE of Mary and the identification information of group 1.

It is supposed that the UE of John is allocated into group 1 and acquires the ID of group 1. If the group ID in the device discovery information parsed by the UE of John is consistent with the group ID to which the UE of John belongs, corresponding processing is performed according to a predefined rule. For example, if the UE of John is discovered to belong to the same group with the UE of Mary, the UE of John sends a discovery response message to the UE of Mary, and confirms that the UE of John and the UE of Mary have been discovered by each other. Optionally, the UE of John judges whether it is necessary to forward the device discovery information sent by the UE of Mary or not according to the predefined rule, or establishes corresponding D2D communication with the UE of Mary.

Instance IV

Mary and John have D2D UE, and after the UE of Mary accesses a network, the UE of Mary decides to enable a D2D discovery and communication function to look for adjacent D2D UE nearby.

Figure 9:
FIG. 9 is a diagram of a D2D discovery information sending format according to instance IV of the disclosure.

The UE of Mary acquires a D2D discovery ID and an air interface resource used for sending device discovery information by virtue of flows similar to those in instance I. If the UE of Mary is currently in a connected state, the UE of Mary assembles the device discovery information after the D2D discovery ID and the air interface resource for sending the device discovery information are determined. The device discovery information may include the D2D discovery ID allocated to the UE of Mary shown in FIG. 9 and a connected state ID of the UE of Mary. State information of the UE is used for indicating whether the UE is in a connected state or an idle state, and may be indicated by an explicit state field, for example: 0 represents the idle state and 1 represents the connected state, and different D2D ID sets may also be allocated to the UE in different states, and the state information of the UE may be implicitly indicated by the D2D ID contained in the device discovery information. In addition, different resource sets bearing the device discovery information may also be allocated to the UE in different states, and the state information of the UE is implicitly indicated by the device discovery information.

It is important to note that a network-side entity needs to allocate D2D discovery IDs to the UE if different D2D discovery ID sets are allocated to the UE in different states, wherein the two D2D discovery IDs are used for the D2D discovery of the UE in the connected state and the idle state respectively. For such a manner of allocating difference resource sets bearing the device discovery information to the UE in different states to implicitly support the state of the UE, the D2D discovery ID sets, which are used for distinguishing the UE in different states, and information about the resource sets bearing the device discovery information are required to be pre-configured by a system or sent to the UE in an air interface broadcasting manner or through proprietary signalling, and the UE is required to reacquire a corresponding device discovery information sending resource during state switching.

After the UE of Mary finishes assembling the device discovery information, the device discovery information is broadcasted on the air interface resource which is allocated or selected by competition. If John is nearby Mary at this moment and the UE of John also accesses the network and a D2D discovery and communication component is enabled, the UE of John may detect the device discovery information broadcasted by Mary. The UE of John receives and parses the device discovery information, and stores the D2D discovery ID corresponding to the UE of Mary and the state information of the UE therein.

If the UE of John expects to establish corresponding D2D communication with the UE of Mary, it is necessary to execute D2D discovery and D2D communication flows on the basis of the stored state of the UE of Mary. Specifically, if the UE is in the idle state, the adjacent UE is required to page the UE to enable the UE to access the network and establish a communication connection when initiating D2D communication with the UE. If the UE is in the connected state, the adjacent UE may directly find a serving eNB of the UE, and establishes the D2D communication connection through the serving eNB of the UE when necessary.

Instance V

Mary and John have D2D UE, and after the UE of Mary accesses a network, the UE of Mary decides to enable a D2D discovery and communication function to look for adjacent D2D UE nearby.

Figure 10:
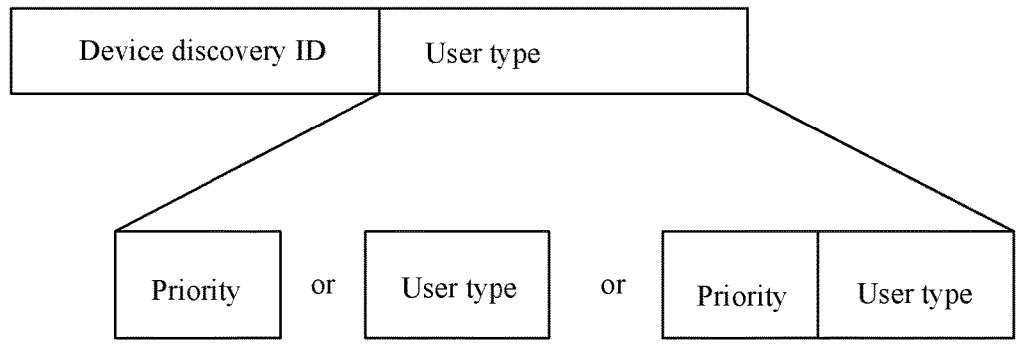
FIG. 10 is a diagram of a D2D discovery information sending format according to instance V f the disclosure.

The UE of Mary acquires a D2D discovery ID and an air interface resource used for sending device discovery information by virtue of flows similar to those in instance I. It is supposed that the UE of Mary suddenly enters an emergency help calling state or Mary is a subscribed user with a higher priority. After the D2D discovery ID and the air interface resource for sending the device discovery information are determined, the UE of Mary assembles the device discovery information, and a format of the assembled device discovery information is shown in FIG. 10. The device discovery information may include the D2D discovery ID allocated to the UE of Mary, the priority and/or user type information. The user type information may indicate whether the UE is an emergency help calling user, an ordinary user or a system management user.

After the UE of Mary finishes assembling the device discovery information, the device discovery information is broadcasted on the air interface resource which is allocated or selected by competition. If John is nearby Mary at this moment and the UE of John also accesses the network and a D2D discovery and communication component runs in the UE of John, the UE of John may detect the device discovery information broadcasted by Mary. The UE of John receives and parses the device discovery information, and stores the D2D discovery ID corresponding to the UE of Mary and user state information therein. If the user type information indicates that the UE of Mary has a higher priority or is an emergency help calling user or a system management user, the UE of John preferably responds to the UE of Mary in a subsequent discovery and D2D communication flow.

Instance VI

Mary and John have D2D UE, and after the UE of Mary accesses a network, the UE of Mary decides to enable a D2D discovery and communication function to look for adjacent D2D UE nearby.

Figure 11:
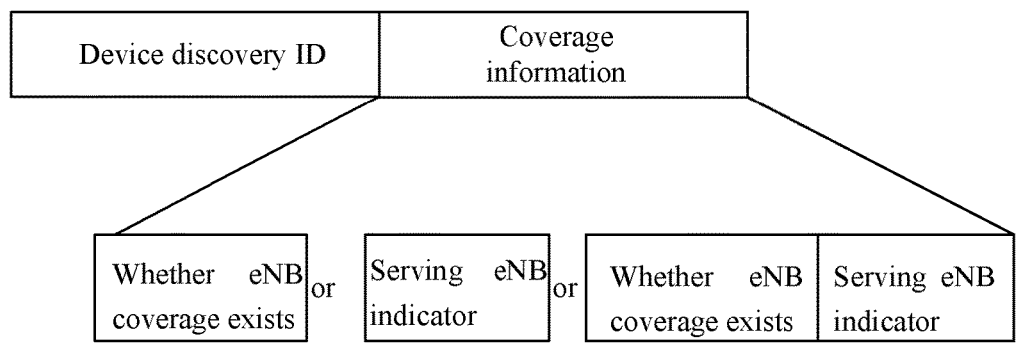
FIG. 11 is a diagram of a D2D discovery information sending format according to instance VI of the disclosure.

The UE of Mary acquires a D2D discovery ID and an air interface resource used for sending device discovery information by virtue of flows similar to those in instance I. After the D2D discovery ID and the air interface resource for sending the device discovery information are determined, the UE of Mary assembles the device discovery information, the device discovery information may include the D2D discovery ID allocated to the UE of Mary and coverage information of the UE of Mary, and a format of the assembled device discovery information is shown in FIG. 11. The coverage information of the UE is used for indicating whether the UE is covered by an eNB or not as well as a UE serving eNB indicator. Information about whether the UE is covered by the eNB or not is indicated by an explicit field, for example: 0 represents no eNB coverage and 1 represents existence of eNB coverage; or special UE serving eNB indication information is allocated for identification. The UE serving eNB indicator may adopt a UE serving eNB ID, or a UE serving cell ID, or a UE serving cell physical ID or other IDs capable of distinguishing adjacent eNBs.

If an ID indicator capable of distinguishing the adjacent eNBs is adopted, it is further necessary to configure IDs capable of distinguishing the adjacent eNBs to the eNBs by a network manager, or the adjacent eNBs select distinguishing IDs and perform interaction to ensure uniqueness of the IDs in adjacent regions through X2 interfaces, and messages bearing the distinguishing IDs of the eNBs in the X2 interfaces may include, but not limited to: X2 establishment messages, adjacent cell configuration messages or other X2 messages capable of bearing the distinguishing IDs of the eNBs. After acquiring the distinguishing IDs of the adjacent eNBs, the eNBs may broadcast the distinguishing IDs to the UE via an air interface or send the distinguishing IDs through proprietary signalling.

After the UE of Mary finishes assembling the device discovery information, the device discovery information, which is borne on the air interface resource which is allocated or selected by competition, is broadcasted. If John is nearby Mary at this moment and the UE of John also accesses the network and a D2D discovery and communication component runs in the UE of John, the UE of John may detect the device discovery information broadcasted by Mary. The UE of John receives and parses the device discovery information, and stores the D2D discovery ID corresponding to the UE of Mary and the coverage information of the UE therein.

If the UE of John expects to establish corresponding D2D communication with the UE of Mary, it is necessary to execute D2D discovery and D2D communication flows on the basis of the stored coverage of the UE of Mary. For example, when the UE of John initiates establishment of a D2D communication connection with the UE of Mary, information about a serving eNB to which the UE of Mary belongs may be contained in a request message sent to a serving eNB to which the UE of John belongs, the serving eNB of the UE of John may judge whether the UE of John and the UE of Mary belong to the same serving eNB or not after receiving the information, and if the UE of John and the UE of Mary do not belong to the same serving eNB, it is necessary to perform X2 interface negotiation during the establishment of the D2D communication connection.

Instance VII

Mary has D2D UE, and drives into a parking lot. After the UE of Mary accesses a network, the UE of Mary decides to enable a D2D discovery and communication function to look for an adjacent idle parking space.

Each parking space in the parking lot corresponds to one piece of D2D UE. The D2D UE of each parking space acquires a D2D discovery ID and an air interface resource required for sending of device discovery information by virtue of flows similar to those in instance II. After the D2D discovery IDs and the air interface resources for sending the device discovery information are determined, the UE of the idle parking spaces assembles the device discovery information, and the device discovery information may include the allocated D2D discovery IDs and parking application information, wherein the parking application information includes, but not limited to: an application type, an application ID and specific application information. Corresponding to a parking application, the specific application information may be information such as numbers, positions and cost about the idle parking spaces. Optionally, the information may be indicated by specially coded D2D discovery IDs.

After the UE of the idle parking spaces finishes assembling the device discovery information, the device discovery information, which is borne on the air interface resources which are allocated or selected by competition, is broadcasted. If the UE of Mary gradually drives into the parking lot, the UE of Mary may detect the device discovery information broadcasted by the idle parking spaces. The UE of Mary receives and parses the device discovery information, and stores the D2D discovery ID corresponding to the UE of Mary and the parking application information therein.

The UE of Mary finds the nearest parking space according to the indication of the numbers, positions and cost of the idle parking spaces provided by the parking application information, and is parked at the corresponding position.

Preferred Embodiment II

In a preferred embodiment, a corresponding method for sending device discovery information on the basis of a partial network coverage scenario (communication mode 2 in FIG. 1) is provided. The preferred embodiment has the characteristic that D2D equipment covered by a network serves as relays (i.e. relay nodes) and D2D equipment positioned in a coverage edge region of the network or uncovered by the network communicates with an eNB as D2D equipment serving as the relays. Detailed description is given below with reference to instance VIII.

Instance VIII

Mary and John have D2D UE, and the UE of Mary accesses a network and enables a D2D discovery and communication function of the UE of Mary. The UE of Mary is positioned on an edge of a cell, and the UE of Mary decides to serve as a relay node to help other adjacent UE out of coverage of the eNB nearby to forward data.

The UE of Mary acquires a D2D discovery ID and an air interface resource used for sending device discovery information by virtue of flows similar to those in instance I to instance VII. After the D2D discovery ID and the air interface resource for sending the device discovery information are determined, the UE of Mary assembles the device discovery information, and a format of the assembled device discovery information is shown in FIG. 6. The device discovery information includes the D2D discovery ID allocated to the UE of Mary and D2D capability profile. The D2D capability profile indicates a D2D capability set of the UE, for example: a D2D communication capability, a relay capability, a power level, a transmission mode, multi-antenna, retransmission, multimode multi-system supporting, a load capability and security. A type of the D2D capability profile is set by a system in a unified manner, and the UE selects a proper D2D capability profile according to own capability, and the selected D2D capability profile is indicated in the device discovery information.

Optionally, the device discovery information sent by the UE only indicates the power level of the UE and whether the UE has the D2D communication capability or not. The power level of the UE indicates a current residual power level of the UE, for example: unlimited, high, middle and low. Information about whether the UE has the D2D communication capability or not indicates whether the UE can perform D2D communication with other D2D UE or not.

Optionally, the device discovery information sent by the UE contains the power level of the UE and indication information about whether the UE has the D2D communication capability or not, and also contains the D2D capability profile, and the D2D capability profile mainly includes the capability information of the transmission mode, multi-antenna, retransmission, security and the like.

After the UE of Mary finishes assembling the device discovery information, the device discovery information, which is borne on the air interface resource which is allocated or selected by competition, is broadcasted. If UE of John is nearby Mary at this moment but is not within the coverage of an eNB or a signal of the UE of the John is very weak, the UE of John enables a D2D discovery and communication component and detects the device discovery information broadcasted by Mary, and the UE of John receives and parses the device discovery information, and stores the D2D discovery ID corresponding to the UE of Mary and the device capability information of the UE of Mary in the device discovery information.

If the device capability information, stored by the UE of John, of the UE of Mary indicates that the UE of Mary has the relay capability, the UE of John may initiate forwarding for communication with a serving eNB of the UE of Mary through the UE of Mary when necessary.

Preferred Embodiment III

In a preferred embodiment, a corresponding method for sending device discovery information on the basis of a network coverage-free scenario (communication mode 3 in FIG. 1) is provided. In the preferred embodiment, D2D equipment uncovered by a network directly communicates with one another or performs multi-hop forwarding communication through other D2D equipment serving as relays. Detailed description is given below with reference to instance IX.

Instance IX

Mary and John have D2D UE, and the UE of Mary and John is supposed not to be within coverage of an eNB. The UE of Mary and John employs device IDs as D2D discovery IDs or automatically selects non-conflicting device discovery IDs according to a system specification, and then competes to acquire air interface resources required by sending of device discovery information. After the D2D discovery IDs and the air interface resources for sending the device discovery information are determined, the UE of Mary assembles the device discovery information. The device discovery information includes the D2D discovery ID allocated to the UE of Mary, an attribute update cont value and a D2D capability profile. When D2D capability profile information sent by the UE of Mary or other attribute information of the UE is updated, the attribute update count value changes according to a rule set by a system. The D2D capability profile indicates a D2D capability set of the UE, for example: a D2D communication capability, a relay capability, a power level, a transmission mode, multi-antenna, retransmission, multimode multi-system supporting, a load capability and security. A type of the D2D capability profile is set by the system in a unified manner, and the UE selects a proper D2D capability profile according to own capability, and the selected D2D capability profile is contained in the device discovery information.

After the UE of Mary finishes assembling the device discovery information, the device discovery information borne on the air interface resource which is allocated or selected by competition is broadcasted. If UE of John is nearby Mary at this moment, the UE of John detects the device discovery information broadcasted by the UE of Mary, the UE of John receives and parses the device discovery information, and if information corresponding to the device discovery ID is not received, the UE of John stores the D2D discovery ID corresponding to the UE of Mary, the attribute update count value and the device capability information of the UE of Mary in the device discovery information; and if the information corresponding to the device discovery ID is received and the attribute update count value is different from an attribute update count value which is stored before and corresponds to the UE of Mary, the UE of John updates the attribute update count value and the device capability information of the UE of Mary.

If the device capability information, stored by the UE of John, of the UE of Mary indicates that the UE of Mary has the relay capability, the UE of John may initiate forwarding for communication with other UE adjacent to Mary, such as UE of Peter, through the UE of Mary when necessary.

If the power level, stored by the UE of John, of the UE of Mary indicates that the power level of the UE of Mary is low, the UE of John reduces data forwarding or data communication through the UE of Mary as much as possible.

Instance X

Mary and John have D2D UE, and the UE of Mary and John is supposed not to be within coverage of an eNB. The UE of Mary decides to enable a D2D discovery and communication function to look for adjacent D2D UE nearby.

It is supposed that the UE of Mary is allocated into group 1 according to a certain rule and acquires an ID of group 1 and the UE of Mary expects to initiate adjacent UE discovery based on group 1. After a D2D discovery ID and an air interface resource for sending device discovery information are determined, the UE of Mary assembles the device discovery information, and a format of the assembled device discovery information is shown by c in FIG. 8. The device discovery information may include identification information, which is allocated to the UE of Mary, of group 1, as shown by c in FIG. 8. the device discovery information sent by the air interface resource optionally contains multiple pieces of device discovery information.

After the UE of Mary finishes assembling the device discovery information, the device discovery information borne on the air interface resource which is allocated or selected by competition is broadcasted. If John is nearby Mary at this moment and the UE of John also accesses a network and a D2D discovery and communication component runs in the UE of John, the UE of John may detect the device discovery information broadcast by Mary. The UE of John receives and parses the device discovery information, and stores the identification information of group 1 corresponding to the UE of Mary in the device discovery information.

It is supposed that the UE of John is allocated into group 1 and acquires the ID of group 1. If the group ID in the device discovery information parsed by the UE of John is consistent with its own group ID, corresponding processing is performed according to a predefined rule. For example, if the UE of John is discovered to belong to the same group with the UE of Mary, the UE of John sends a discovery response message to the UE of Mary, and confirms that the UE of John and the UE of Mary have been discovered by each other. Optionally, the UE of John judges whether it is necessary to forward the device discovery information sent by the UE of Mary or not according to the predefined rule, or establishes corresponding D2D communication with the UE of Mary.

Each preferred instance discloses the methods for sending the device discovery information and gives information types and information formats in discovery signalling in various scenarios for the D2D UE to rapidly judge whether the UE is UE in which the D2D UE is interested in and simplify the D2D discovery and communication flows.

In another embodiment, software is further provided, which is used for executing the technical solutions described in the abovementioned embodiments and preferred embodiments.

In another embodiment, a storage medium is further provided, in which the abovementioned software is stored, the storage medium including, but not limited to: a compact disc, a floppy disk, a hard disk, an erasable memory and the like.

From the description above, it can be seen that the disclosure has technical effects as follows: in the preferred embodiments, the device discovery information sent by the second UE contains the attribute information of the UE, so that the UE receiving the device discovery information may further determine whether to execute D2D discovery and/or D2D communication or not according to the attribute information of the UE therein. In such a manner, the problem of difficulty in meeting a requirement on D2D communication diversity caused by containing of only an ID in the device discovery information in the related technology is effectively solved, and the technical effect of improving D2D communication effectiveness and flexibility is achieved.

Obviously, those skilled in the art should know that each module or step of the disclosure may be implemented by a universal computing device, and the modules or steps can be concentrated on a single computing device or distributed on a network formed by a plurality of computing devices, and may optionally be implemented by programmable codes executable for the computing devices, so that the modules or steps may be stored in a storage device for execution with the computing devices, or the shown or described steps may be executed in a sequence different from the sequence here under a certain condition, or the modules or steps may form each integrated circuit module, or multiple modules or steps therein may form a single integrated circuit module for implementation. As a consequence, the disclosure is not limited to any specific hardware and software combination.

The above is only the preferred embodiment of the disclosure and not intended to limit the disclosure, and for those skilled in the art, the disclosure may have various modifications and variations. Any modifications, equivalent replacements, improvements and the like within the spirit and principle of the disclosure shall fall within the scope of protection of the disclosure.

INDUSTRIAL APPLICABILITY

The technical solutions provided by the embodiment of the disclosure may be applied to the field of communication, the problem difficulty in meeting a requirement on D2D communication diversity caused by containing of only an ID in device discovery information in the related technology is effectively solved, and the technical effect of improving D2D communication effectiveness and flexibility is achieved.

What is claimed is:

1. A method for receiving device discovery information, comprising:

receiving, by first User Equipment (UE), device discovery information sent by second UE, wherein the device discovery information contains at least one piece of the following information: UE identification information and attribute information of the UE; and performing, by the first UE, Device-to-Device (D2D) discovery and/or D2D communication under the condition that the device discovery information is consistent with a preset condition;

wherein the attribute information of the UE comprises at least one piece of the following information: an attribute update count value, UE capability information, UE type information, UE group information, UE state information, UE coverage information and application related information;

wherein performing, by the first UE, D2D discovery and/or D2D communication under the condition that the device discovery information is consistent with the preset condition comprises:

under the condition that the device discovery information contains an attribute update count value, judging, by the first UE, whether the information of the second UE and the corresponding attribute update count value have been received or not, and based on that the information of the second UE and the corresponding attribute update count value have not been received and/or the received attribute update count value is different, storing, by the first UE, the attribute update count value in the device discovery information, and acquiring other attribute information; and/or under the condition that the device discovery information contains relay capability information of the second UE, storing, by the first UE, the second UE, and when the first UE searches for a relay node for signalling and data forwarding, employing the second UE as a candidate relay node; and/or under the condition that the device discovery information contains indication information about whether the second UE has D2D communication capability or not, judging, by the first UE, whether to initiate D2D communication with the second UE or not according to the indication information about whether the second UE has the D2D communication capability information or not; and/or under the condition that the device discovery information contains D2D capability profile information of the second UE, selecting, by the first UE, a plurality of communication parameters when initiating establishment of a D2D communication connection with the second UE according to the D2D capability profile information of the second UE; and/or under the condition that the device discovery information contains type information of the second UE, responding to, by the first UE, UE with a high priority and/or UE of an emergency help calling user according to the type information of the second UE; and/or under the condition that the device discovery information contains group information of the second UE and the first UE also belongs to a group indicated by the group information, performing, by the first UE, D2D group-based device discovery according to the group information of the second UE; and/or under the condition that the device discovery information contains state information of the second UE, performing, by the first UE, D2D discovery and D2D communication flows according to a state of the second UE; and/or under the condition that the device discovery information contains coverage information of the second UE, finishing, by the first UE, device discovery and/or D2D communication connection establishment with the second UE through a serving eNB of the first UE according to the coverage information of the second UE; and/or under the condition that the device discovery information contains application related information of the second UE, judging, by the first UE, whether an application indicated by the application related information of the second UE is an application in which the first UE is interested or not, and if YES, presenting, by the first UE, preset information corresponding to the application in which the first UE is interested.

2. The method according to claim 1, wherein
the UE identification information comprises at least one piece of the following information: a D2D discovery Identifier (ID) of the second UE and a D2D discovery ID of UE which is expected to be discovered by the second UE; or
the UE identification information comprises at least one piece of the following information: a device ID of the second UE, a device ID of UE which is expected to be discovered by the second UE, an ID allocated by a network entity and used for device discovery and a UE ID determined according to a system specification.

3. The method according to claim 1, wherein
the attribute information of the UE comprises at least one piece of the following information: attribute information of the second UE and attribute information of the UE which is expected to be discovered by the second UE.

4. The method according to claim 3, wherein
the attribute update count value is used for indicating an updating condition of at least one piece of the following attribute information of the UE: the UE capability information, the UE type information, the UE group information, the UE state information, the UE coverage information and the application related information; and/or
the UE capability information comprises at least one piece of the following information: information about a UE power level, information about whether the UE has a relay capability or not, information about whether the UE has a D2D communication capability or not and a D2D capability profile, wherein the UE power level is used for indicating a power level of current residual power of the UE, information about whether the UE has the relay capability or not is used for indicating whether the UE can forward control signalling and/or service data of other D2D UE or not, information about whether the UE has the D2D communication capability or not is used for indicating whether the UE can perform D2D communication with the other D2D UE or not, and the D2D capability profile is used for indicating a D2D capability set of the UE; and/or
the UE type information comprises at least one piece of the following information: a UE priority and a UE type; and/or
the UE group information comprises a D2D group ID of the D2D UE; and/or
the UE state information is used for indicating a state of the UE, wherein the state comprises: a connected state and/or an idle state; and/or
the UE coverage information is used for indicating at least one piece of the following information: information about whether the UE is covered by an eNB or not, a serving eNB of the UE and a discovery area of the UE; and/or
the application related information comprises attribute information related to a D2D application.

5. The method according to claim 4, wherein
the power level of the current residual power comprises one of the followings: unlimited, high, middle and low, whether the UE has the relay capability or not is implicitly indicated by the power level of the UE, and a D2D capability comprises at least one of the followings: a D2D communication capability, the relay capability, the power level, a transmission mode, multi-antenna, retransmission, security, multimode multi-system supporting, a load indicator and a supported service type; and/or
the UE type comprises at least one of the followings: an emergency help calling user, an ordinary user and a system management user; and/or
the D2D group ID of the D2D UE contains D2D group information of one or more D2D groups to which the UE belongs; and/or
the state of the UE is indicated in one of manners as follows: an explicit state field, implicit indication with a D2D discovery ID and implicit indication with a resource for sending the discovery information, wherein different resource sets bearing the device discovery information are allocated to the UE in different states; and/or
whether the UE is covered by the eNB or not is indicated in one of manners as follows: indication through an explicit field and identification through UE serving eNB indication information, wherein the UE serving eNB indication information is an ID used for distinguishing adjacent eNB s; and/or
the attribute information related to the D2D application comprises at least one of the followings: an application type, an application ID and specific application information.

6. The method according to claim 5, wherein
the D2D discovery ID and the resource set bearing the device discovery information are broadcasted to the second UE by the eNB via an air interface or sent to the second UE through special signalling.

7. The method according to claim 5, wherein
the ID used for distinguishing the adjacent eNBs comprises at least one of: a UE serving eNB ID, a UE serving cell ID and a UE serving cell physical ID; or
the ID used for distinguishing the adjacent eNBs is an ID configured by a network manager for each eNB to distinguish the adjacent eNBs, or is an ID that each eNB actively selects own distinguishing ID, and performs interaction, via an X2 interface, with the eNB in an adjacent cell to ensure uniqueness of the distinguishing ID.

8. The method according to claim 3, wherein performing, by the first UE, D2D discovery and/or D2D communication under the condition that the device discovery information contains the attribute information of the UE which is expected to be discovered by the second UE comprises:

judging, by the first UE, whether its own attribute is consistent with the attribute information, in the device discovery information, of the UE which is expected to be discovered by the second UE or not, and if YES, sending, by the first UE, a discovery response message to the second UE directly or through the network entity;

wherein the discovery response message contains the D2D discovery ID of the first UE and/or the D2D discovery ID of the second UE.

9. The method according to claim 1, wherein sending, by the second UE, the device discovery information comprises:

sending, by the second UE, the device discovery information through a synchronous signal and/or a broadcast channel.

10. The method according to claim 1, wherein performing, by the first UE, D2D discovery and/or D2D communication under the condition that the device discovery information is consistent with the preset condition comprises:

sending, by the first UE, a discovery response message to the second UE under the condition that a D2D discovery ID of the UE, which is expected to be discovered by the second UE, in the device discovery information is the same as a D2D discovery ID of the first UE; and receiving, by the second UE, the discovery response message;

wherein sending, by the first UE, the discovery response message to the second UE comprises: directly sending, by the first UE, the discovery response message to the second UE; or, sending, by the first UE, the discovery response message to the second UE through a network entity.

11. The method according to claim 10, wherein performing, by the first UE, the D2D discovery and D2D communication flows according to the state of the second UE comprises:

under the condition that the second UE is in an idle state, paging, by the first UE, the second UE to enable the second UE to access a network and establish a communication connection when the first UE initiates D2D communication with the second UE; and/or under the condition that the second UE is in a connected state, searching for, by the first UE, a serving eNB of the second UE, and establishing the D2D communication connection through the found serving eNB.

12. A method for sending device discovery information, comprising:

sending, by first User Equipment (UE), device discovery information, wherein the device discovery information contains UE identification information and/or attribute information of the UE;

wherein the attribute information of the UE comprises at least one piece of the following information: an attribute update count value, UE capability information, UE type information, UE group information, UE state information, UE coverage information and application related information;

wherein the method further comprises: performing, by the first UE, D2D discovery and/or D2D communication under the condition that the device discovery information is consistent with the preset condition comprises:

under the condition that the device discovery information contains an attribute update count value, judging, by the first UE, whether the information of the second UE and the corresponding attribute update count value have been received or not, and based on that the information of the second UE and the corresponding attribute update count value have not been received and/or the received attribute update count value is different, storing, by the first UE, the attribute update count value in the device discovery information, and acquiring other attribute information; and/or under the condition that the device discovery information contains relay capability information of the second UE, storing, by the first UE, the second UE, and when the first UE searches for a relay node for signalling and data forwarding, employing the second UE as a candidate relay node; and/or under the condition that the device discovery information contains indication information about whether the second UE has D2D communication capability or not, judging, by the first UE, whether to initiate D2D communication with the second UE or not according to the indication information about whether the second UE has the D2D communication capability information or not; and/or under the condition that the device discovery information contains D2D capability profile information of the second UE, selecting, by the first UE, a plurality of communication parameters when initiating establishment of a D2D communication connection with the second UE according to the D2D capability profile information of the second UE; and/or under the condition that the device discovery information contains type information of the second UE, responding to, by the first UE, UE with a high priority and/or UE of an emergency help calling user according to the type information of the second UE; and/or under the condition that the device discovery information contains group information of the second UE and the first UE also belongs to a group indicated by the group information, performing, by the first UE, D2D group-based device discovery according to the group information of the second UE; and/or under the condition that the device discovery information contains state information of the second UE, performing, by the first UE, D2D discovery and D2D communication flows according to a state of the second UE; and/or under the condition that the device discovery information contains coverage information of the second UE, finishing, by the first UE, device discovery and/or D2D communication connection establishment with the second UE through a serving eNB of the first UE according to the coverage information of the second UE; and/or under the condition that the device discovery information contains application related information of the second UE, judging, by the first UE, whether an application indicated by the application related information of the second UE is an application in which the first UE is interested or not, and if YES, presenting, by the first UE, preset information corresponding to the application in which the first UE is interested.

13. The method according to claim 12, wherein sending, by the first UE, the device discovery information comprises:

sending, by the first UE, the device discovery information which is borne on a synchronous signal and/or a broadcast channel.

14. The method according to claim 12, wherein
the UE identification information comprises: a Device-to-Device (D2D) discovery Identifier (ID) of the first UE and/or a D2D discovery ID of UE which is expected to be discovered by the first UE; or the UE identification information comprises at least one piece of the following information: a device ID of the first UE, a device ID of UE which is expected to be discovered by the first UE, an ID allocated by a network entity and used for device discovery and a UE ID determined according to a system specification.

15. The method according to claim 12, wherein the attribute information of the UE comprises at least one of: attribute information of the first UE and/or attribute information of the UE which is expected to be discovered by the first UE.

16. The method according to claim 15, wherein
the attribute update count value is used for indicating an updating condition of at least one piece of the following attribute information of the UE: the UE capability information, the UE type information, the UE group information, the UE state information, the UE coverage information and the application related information; and/or
the UE capability information comprises at least one piece of the following information: a UE power level, information about whether the UE has a relay capability or not, information about whether the UE has a D2D communication capability or not and a D2D capability profile, wherein the UE power level is used for indicating a power level of current residual power of the UE, information about whether the UE has the relay capability or not is used for indicating whether the UE can forward control signalling and/or service data of other D2D UE or not, information about whether the UE has the D2D communication capability or not is used for indicating whether the UE can perform D2D communication with the other D2D UE or not, and the D2D capability profile is used for indicating a D2D capability set of the UE; and/or
the UE type information comprises at least one piece of the following information: a UE priority and a UE type; and/or
the UE group information comprises a D2D group ID of the D2D UE; and/or
the UE state information is used for indicating a state of the UE, wherein the state comprises: a connected state and/or an idle state; and/or
the UE coverage information is used for indicating at least one of the followings: whether the UE is covered by an eNB or not, a serving eNB of the UE and a discovery area of the UE; and/or
the application related information comprises attribute information related to a D2D application.

17. The method according to claim 16, wherein
the power level of the current residual power comprises one of the followings: unlimited, high, middle and low, whether the UE has the relay capability or not is implicitly indicated by the power level of the UE, and a D2D capability comprises at least one of the followings: a D2D communication capability, the relay capability, the power level, a transmission mode, multi-antenna, retransmission, security, multimode multi-system supporting, a load indicator and a supported service type; and/or
the UE type comprises at least one of the followings: an emergency help calling user, an ordinary user and a system management user; and/or
the D2D group ID of the D2D UE contains D2D group information of one or more D2D groups to which the UE belongs; and/or the state of the UE is indicated in one of manners as follows: an explicit state field, implicit indication with a D2D discovery ID and implicit indication with a resource for sending the discovery information, wherein different resource sets bearing the device discovery information are allocated to the UE in different states; and/or
whether the UE is covered by the eNB or not is indicated in one of manners as follows: indication through an explicit field and identification through UE serving eNB indication information, wherein the UE serving eNB indication information is an ID used for distinguishing adjacent eNBs; and/or
the attribute information related to the D2D application comprises at least one piece of the following information: an application type, an application ID and specific application information.

18. User Equipment (UE), comprising a hardware processor configured to execute programming components stored in a memory, wherein the programming components comprise:
a receiving element configured to receive device discovery information sent by another UE, wherein the device discovery information contains at least one piece of the following information: UE identification information and attribute information of the UE; and
an execution element configured to execute Device-to-Device (D2D) discovery and/or D2D communication under the condition that the device discovery information is consistent with a preset condition;
wherein the attribute information of the UE comprises at least one piece of the following information: an attribute update count value, UE capability information, UE type information, UE group information, UE state information, UE coverage information and application related information;
wherein the execution element comprises,
a first execution component, configured to, under the condition that the device discovery information contains an attribute update count value, judge whether the information of the UE where the execution element is located and the corresponding attribute update count value have been received or not, and if the information of the UE where the execution element is located and the corresponding attribute update count value have not been received and/or the received attribute update count value is different, store the attribute update count value in the device discovery information, and acquire other attribute information; and/or
a second execution component configured to, under the condition that the device discovery information contains relay capability information of the other UE, store the other UE, and when the UE where the execution element is located searches for a relay node for signalling and data forwarding, employ the other UE as a candidate relay node; and/or
a third execution component configured to under the condition that the device discovery information contains indication information about whether the other UE has D2D communication capability information or not, judge whether to initiate D2D communication with the other UE or not according to the indication information about whether the other UE has the D2D communication capability information or not; and/or
a fourth execution component configured to, under the condition that the device discovery information contains D2D capability profile information of the other UE, select a plurality of communication parameters when initiating establishment of a D2D communication connection with the other UE according to the D2D capability profile information of the other UE; and/or a fifth execution component configured to, under the condition that the device discovery information contains type information of the other UE, preferably respond to UE with a high priority and/or UE of an emergency help calling user according to the type information of the other UE; and/or a sixth execution component configured to, under the condition that the device discovery information contains group information of the other UE and the UE where the execution element is located also belongs to a group indicated by the group information, execute D2D group-based device discovery according to the group information of the other UE; and/or a seventh execution component configured to, under the condition that the device discovery information contains state information of the other UE, execute D2D discovery and D2D communication flows according to a state of the other UE; and/or an eighth execution component configured to, under the condition that the device discovery information contains coverage information of the other UE, finish device discovery and/or D2D communication connection establishment with the other UE through a serving eNB of the UE where the execution element is located according to the coverage information of the other UE; and/or a ninth execution component configured to, under the condition that the device discovery information contains application related information of the other UE, judge whether an application indicated by the application related information of the other UE is an application in which the UE where the execution element is located is interested or not, and if YES, present preset information corresponding to the application in which the UE where the execution element is located is interested.

19. The UE according to claim 18, wherein
the attribute information of the UE comprises at least one piece of the following information: attribute information of the other UE and attribute information of UE which is expected to be discovered by the other UE.

20. The UE according to claim 19, wherein
the attribute update count value is used for indicating an updating condition of at least one piece of the following attribute information of the UE: the UE capability information, the UE type information, the UE group information, the UE state information, the UE coverage information and the application related information; and/or the UE capability information comprises at least one piece of the following information: a UE power level, information about whether the UE has a relay capability or not, information about whether the UE has a D2D communication capability or not and a D2D capability profile, wherein the UE power level is used for indicating a power level of current residual power of the UE, information about whether the UE has the relay capability or not is used for indicating whether the UE can forward control signalling and/or service data of other D2D UE or not, information about whether the UE has the D2D communication capability or not is used for indicating whether the UE can perform D2D communication with the other D2D UE or not, and the D2D capability profile is used for indicating a D2D capability set of the UE; and/or the UE type information comprises at least one piece of the following information: a UE priority and a UE type; and/or the UE group information comprises a D2D group Identifier (ID) of the D2D UE; and/or the UE state information is used for indicating a state of the UE, wherein the state comprises: a connected state and/or an idle state; and/or the UE coverage information is used for indicating at least one piece of the following information: information about whether the UE is covered by an Evolved Node B (eNB) or not, a serving eNB of the UE and a discovery area of the UE; and/or the application related information comprises attribute information related to a D2D application.

21. The UE according to claim 20, wherein
the power level of the current residual power comprises one of the followings: unlimited, high, middle and low, whether the UE has the relay capability or not is implicitly indicated by the power level of the UE, and a D2D capability comprises at least one of the followings: a D2D communication capability, the relay capability, the power level, a transmission mode, multi-antenna, retransmission, security, multimode multi-system supporting, a load indicator and a supported service type; and/or the UE type comprises at least one of the followings: an emergency help calling user, an ordinary user and a system management user; and/or the D2D group ID of the D2D UE contains D2D group information of one or more D2D groups to which the UE belongs; and/or the state of the UE is indicated in on one of manners as follows: an explicit state field, implicit indication with a D2D discovery ID and implicit indication with a resource for sending the discovery information, wherein different resource sets bearing the device discovery information are allocated to the UE in different states; and/or whether the UE is covered by the eNB or not is indicated in one of manners as follows: indication through an explicit field and identification through UE serving eNB indication information, wherein the UE serving eNB indication information is an ID used for distinguishing adjacent eNBs; and/or the attribute information related to the D2D application comprises at least one piece of the following information: an application type, an application ID and specific application information.

22. User Equipment (UE), comprising: a hardware processor, configured to perform programming components stored in a memory, wherein the programming components comprise:

a sending element configured to send device discovery information, wherein the device discovery information contains UE identification information and/or attribute information of the UE;

wherein the attribute information of the UE comprises at least one piece of the following information: an attribute update count value, UE capability information, UE type information, UE group information, UE state information, UE coverage information and application related information;

wherein the UE further comprises a execution element; the execution element comprises:

a first execution component, configured to, under the condition that the device discovery information contains an attribute update count value, judge whether the information of the UE where the execution element is located and the corresponding attribute update count value have been received or not, and if the information of the UE where the execution element is located and the corresponding attribute update count value have not been received and/or the received attribute update count value is different, store the attribute update count value in the device discovery information, and acquire other attribute information; and/or a second execution component configured to, under the condition that the device discovery information contains relay capability information of the other UE, store the other UE, and when the UE where the execution element is located searches for a relay node for signalling and data forwarding, employ the other UE as a candidate relay node; and/or a third execution component configured to, under the condition that the device discovery information contains indication information about whether the other UE has D2D communication capability information or not, judge whether to initiate D2D communication with the other UE or not according to the indication information about whether the other UE has the D2D communication capability information or not; and/or a fourth execution component configured to, under the condition that the device discovery information contains D2D capability profile information of the other UE, select a plurality of communication parameters when initiating establishment of a D2D communication connection with the other UE according to the D2D capability profile information of the other UE; and/or a fifth execution component configured to, under the condition that the device discovery information contains type information of the other UE, preferably respond to UE with a high priority and/or UE of an emergency help calling user according to the type information of the other UE; and/or a sixth execution component configured to, under the condition that the device discovery information contains group information of the other UE and the UE where the execution element is located also belongs to a group indicated by the group information, execute D2D group-based device discovery according to the group information of the other UE; and/or a seventh execution component configured to, under the condition that the device discovery information contains state information of the other UE, execute D2D discovery and D2D communication flows according to a state of the other UE; and/or an eighth execution component configured to, under the condition that the device discovery information contains coverage information of the other UE, finish device discovery and/or D2D communication connection establishment with the other UE through a serving eNB of the UE where the execution element is located according to the coverage information of the other UE; and/or a ninth execution component configured to, under the condition that the device discovery information contains application related information of the other UE, judge whether an application indicated by the application related information of the other UE is an application in which the UE where the execution element is located is interested or not, and if YES, present preset information corresponding to the application in which the UE where the execution element is located is interested.

23. The UE according to claim 22, wherein the sending element is further configured to send the device discovery information which is borne on a synchronous signal and/or a broadcast channel.

24. The UE according to claim 22, wherein the attribute update count value is used for indicating an updating condition of at least one piece of the following attribute information of the UE: the UE capability information, the UE type information, the UE group information, the UE state information, the UE coverage information and the application related information; and/or the UE capability information comprises at least one piece of the following information: a UE power level, information about whether the UE has a relay capability or not, information about whether the UE has a Device-to-Device (D2D) communication capability or not and a D2D capability profile, wherein the UE power level is used for indicating a power level of current residual power of the UE, information about whether the UE has the relay capability or not is used for indicating whether the UE can forward control signalling and/or service data of other D2D UE or not, information about whether the UE has the D2D communication capability or not is used for indicating whether the UE can perform D2D communication with the other D2D UE or not, and the D2D capability profile is used for indicating a D2D capability set of the UE; and/or the UE type information comprises at least one piece of the following information: a UE priority and a UE type; and/or the UE group information comprises a D2D group Identifier (ID) of the D2D UE; and/or the UE state information is used for indicating a state of the UE, wherein the state comprises: a connected state and/or an idle state; and/or the UE coverage information is used for indicating at least one of the followings: whether the UE is covered by an Evolved Node B (eNB) or not, a serving eNB of the UE and a discovery area of the UE; and/or the application related information comprises attribute information related to a D2D application.

* * * * *